US010890152B2

(12) United States Patent
Kato

(10) Patent No.: US 10,890,152 B2
(45) Date of Patent: *Jan. 12, 2021

(54) FUEL INJECTION DEVICE

(71) Applicant: DENSO CORPORATION, Kariya (JP)

(72) Inventor: Noritsugu Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,525

(22) Filed: Jul. 24, 2019

(65) Prior Publication Data

US 2019/0345907 A1    Nov. 14, 2019

Related U.S. Application Data

(63) Continuation of application No. 15/743,409, filed as application No. PCT/JP2016/070488 on Jul. 12, 2016, now Pat. No. 10,408,180.

(30) Foreign Application Priority Data

Jul. 24, 2015 (JP) .................................. 2015-146636

(51) Int. Cl.

| *F02M 61/18* | (2006.01) |
|---|---|
| *F02M 61/04* | (2006.01) |
| *F02M 61/10* | (2006.01) |

(52) U.S. Cl.
CPC ........ *F02M 61/1813* (2013.01); *F02M 61/04* (2013.01); *F02M 61/10* (2013.01);
(Continued)

(58) Field of Classification Search
CPC .... F02M 61/1813; F02M 61/04; F02M 61/10; F02M 61/18; F02M 61/1806; F02M 61/1833; F02M 61/184; F02M 61/1853
(Continued)

(56) References Cited

U.S. PATENT DOCUMENTS

| RE40,199 E | 4/2008 | Sugimoto et al. |
|---|---|---|
| 8,016,214 B2 | 9/2011 | Higuma et al. |
| (Continued) | | |

FOREIGN PATENT DOCUMENTS

| JP | 2012-246897 | 12/2012 |
|---|---|---|
| JP | 2014-173447 | 9/2014 |
| JP | 2015-078604 | 4/2015 |

*Primary Examiner* — Steven J Ganey
(74) *Attorney, Agent, or Firm* — Nixon & Vanderhye P.C.

(57) ABSTRACT

Among all combinations of two injection holes, in a combination in which when the injection holes are offset such that their central axes are coincident with each other in inlet openings, an inter-injection hole angle formed by the central axes is minimized, the inter-injection hole angle between the two injection holes is represented as yamin[deg], taper angles, which are formed by the respective contours of the injection hole inner walls in the cross sections along the virtual planes including the central axes of the two injection holes that allow the inter-injection hole angle to be minimized, are represented as $\theta a1$ and $\theta a2$[deg], and when fuel is injected from the injection holes, average pressure of the fuel in the fuel passage is represented as P[Mpa], and the injection holes are formed so as to satisfy a relationship: $\gamma_{amin} \geq \theta a1 + \theta a2 + 0.5 \times P^{0.6}$.

10 Claims, 11 Drawing Sheets

(52) U.S. Cl.
CPC .......... *F02M 61/18* (2013.01); *F02M 61/184* (2013.01); *F02M 61/1806* (2013.01); *F02M 61/1833* (2013.01); *F02M 61/1853* (2013.01)

(58) Field of Classification Search
USPC .......... 239/533.12, 552, 585.1, 585.4, 585.5, 239/601, 596
See application file for complete search history.

(56) References Cited

U.S. PATENT DOCUMENTS

| | | |
|---|---|---|
| 8,191,800 B2 | 6/2012 | Kitagawa et al. |
| 8,302,886 B2 | 11/2012 | Hashii et al. |
| 10,408,180 B2 * | 9/2019 | Kato .................. F02M 61/1813 |
| 2004/0046062 A1 * | 3/2004 | Xu ..................... F02M 51/0675 239/533.11 |
| 2004/0217213 A1 * | 11/2004 | Nally ................ F02M 61/1846 239/585.1 |
| 2005/0040258 A1 * | 2/2005 | Dallmeyer ........... F02M 61/168 239/533.12 |
| 2005/0194458 A1 * | 9/2005 | Bierstaker .......... F02M 61/1853 239/5 |
| 2006/0060674 A1 * | 3/2006 | Cristiani ............. F02M 61/182 239/533.11 |
| 2006/0157595 A1 * | 7/2006 | Peterson, Jr. ...... F02M 61/1853 239/533.12 |
| 2014/0252137 A1 | 9/2014 | Oomura et al. |
| 2018/0202405 A1 | 7/2018 | Kato |

\* cited by examiner

FUEL INJECTION DEVICE

CROSS REFERENCE TO RELATED APPLICATIONS

This application is a continuation of application Ser. No. 15/743,409, filed Jan. 10, 2018, which is the U.S. national phase of International Application No. PCT/JP2016/070488, filed Jul. 12, 2016, which claims priority to Japanese Patent Application No. 2015-146636 filed on Jul. 24, 2015, the entire contents of each of which are incorporated herein by reference.

TECHNICAL FIELD

The present disclosure relates to a fuel injection device that injects and supplies fuel into an internal combustion engine.

BACKGROUND ART

Conventionally, it is known that a fuel injection device has a plurality of injection holes that each has a tapered shape such that its inner wall is gradually away from a central axis as going from an inlet opening toward an outlet opening. For example, Patent Literature 1 describes a fuel injection device having six injection holes each having a tapered inner wall.

In the fuel injection device of Patent Literature 1, since the diameter of the inner wall of the injection hole increases as going toward the outlet opening, a spray of fuel injected from the injection hole spreads so as to be gradually away from the central axis of the injection hole. As a result, atomization of the fuel spray can be achieved.

When an angle formed by central axes of the plurality of injection holes is small, or when a distance between outlet openings of the injection holes is short, sprays of the fuel injected from the injection holes may be attracted to each other due to the Coanda effect. This may deteriorate robustness of the spray shape against variations in atmospheric pressure or ambient temperature. In addition, atomization of the fuel spray may be hindered by collision between the fuel sprays affected by the Coanda effect. Consequently, an increase in unburned fuel and/or a deterioration in fuel economy may occur.

In the fuel injection device of Patent Literature 1, six injection holes are provided, an angle formed by the central axes of the injection holes is relatively small, and a distance between the outlet openings of the injection holes is relatively short. Among all combinations of two injection holes, in a combination in which when the injection holes are offset such that their central axes are coincident with each other in the inlet openings, an inter-injection hole angle formed by the central axes is minimized, the inter-injection hole angle between the two injection holes is set small. Alternatively, among all combinations of two injection holes, in a combination in which the distance between the outlet openings is minimized, an inter-injection hole angle, which is formed by the central axes when the injection holes are offset such that their central axes are coincident with each other in the inlet openings, is set small. On the other hand, a taper angle, which is formed by a contour of an inner wall of the injection hole in a cross section along a virtual plane including the central axis of the injection hole, is set large. In the fuel injection device of Patent Literature 1, therefore, the fuel spray injected from the injection hole may be greatly affected by the Coanda effect.

Influence of the Coanda effect typically increases with an increase in pressure of the injected fuel. In the fuel injection device of Patent Literature 1, therefore, higher pressure of injected fuel may cause a further increase in unburned fuel and/or a further deterioration in fuel economy.

PRIOR ART LITERATURES

Patent Literature

[Patent Literature 1] JP 2012-246897 A

SUMMARY OF INVENTION

An object of the present disclosure is to provide a fuel injection device capable of reducing influence of the Coanda effect on a spray of injected fuel.

The fuel injection device of the present disclosure includes a nozzle part.

The nozzle part includes a nozzle cylinder portion internally forming a fuel passage, a nozzle bottom portion closing one end of the nozzle cylinder portion, and a plurality of injection holes that connect between a surface of the nozzle bottom portion on a side close to the nozzle cylinder portion and a surface of the nozzle bottom portion on a side opposite to the nozzle cylinder portion, and inject fuel in the fuel passage.

Each injection hole includes an inlet opening formed in the surface of the nozzle bottom portion on the side close to the nozzle cylinder portion, an outlet opening formed in the surface of the nozzle bottom portion on the side opposite to the nozzle cylinder portion, and an injection hole inner wall that is connected to the inlet opening and the outlet opening and has a tapered shape so as to be gradually away from a central axis of the injection hole as going from the inlet opening toward the outlet opening. Hence, the spray of the fuel injected from the injection hole spreads so as to be gradually away from the central axis of the injection hole. As a result, atomization of the fuel spray can be achieved.

In the present disclosure, among all combinations of two injection holes, in a combination in which when the injection holes are offset such that their central axes are coincident with each other in the inlet openings, an inter-injection hole angle formed by the central axes is minimized, the inter-injection hole angle between the two injection holes is represented as γamin[deg], taper angles, which are formed by the respective contours of the inner walls of the injection walls in the cross sections along the virtual planes including the central axes of the two injection holes that allow the inter-injection hole angle to be minimized, are represented as θa1 and θa2[deg], and when fuel is injected from the injection hole, the average pressure of the fuel in the fuel passage is represented as P[Mpa], and the injection holes are formed so as to satisfy a relationship:

$$\gamma a\min \geq \theta a1 + \theta a2 + 0.5 \times P^{0.6} \quad \text{(formula 1)}.$$

As described above, in the present disclosure, the inter-injection hole angle between the two injection holes in the combination in which the inter-injection hole angle is minimized is set based on the formula 1 to a value that is less likely to be affected by the Coanda effect depending on the pressure of the fuel in the fuel passage assumed during use of the fuel injection device. Hence, if the pressure of the fuel in the fuel passage is within the assumed range during use of the fuel injection device, the influence of the Coanda effect on the sprays of the fuel injected from the two injection holes can be reduced. This makes it possible to improve robustness of the spray shape against variations in atmospheric pressure or ambient temperature. In addition, it is possible to suppress collision between the fuel sprays due to the Coanda effect and promote atomization of the fuel spray. It is therefore possible to reduce unburned fuel and improve fuel economy.

In another fuel injection device of the present disclosure, among all combinations of two injection holes, in a combination in which a distance between the outlet openings is minimized, when the injection holes are offset such that their central axes are coincident with each other in the inlet openings, an inter-injection hole angle formed by the central axes is represented as γdmin[deg], taper angles, which are formed by the respective contours of the inner walls of the injection holes in the cross sections along the virtual planes including the central axes of the two injection holes that allow the distance between the outlet openings to be minimized, are represented as θd1 and θd2[deg], and when fuel is injected from the injection hole, the average pressure of the fuel in the fuel passage is represented as P[Mpa], and the injection holes are formed so as to satisfy a relationship: γdmin≥θd1+θd2+0.5× $P^{0.6}$ (formula 2).

As described above, in the present disclosure, the inter-injection hole angle between the injection holes in the combination, in which the distance between the outlet openings is minimized, is set based on the formula 2 to a value that is less likely to be affected by the Coanda effect depending on an assumed pressure of the fuel in the fuel passage during use of the fuel injection device. Hence, if the pressure of the fuel in the fuel passage is within an assumed range during use of the fuel injection device, the influence of the Coanda effect on the spray of the fuel injected from the two injection holes can be reduced. This makes it possible to improve robustness of the spray shape against variations in atmospheric pressure or ambient temperature. In addition, it is possible to suppress collision between the fuel sprays due to the Coanda effect and promote atomization of the fuel spray. It is therefore possible to reduce unburned fuel and improve fuel economy.

BRIEF DESCRIPTION OF DRAWINGS

The above and other objects, features and advantages of the present disclosure will become more apparent from the following detailed description made with reference to the accompanying drawings.

EMBODIMENTS FOR CARRYING OUT INVENTION

Figure 1:
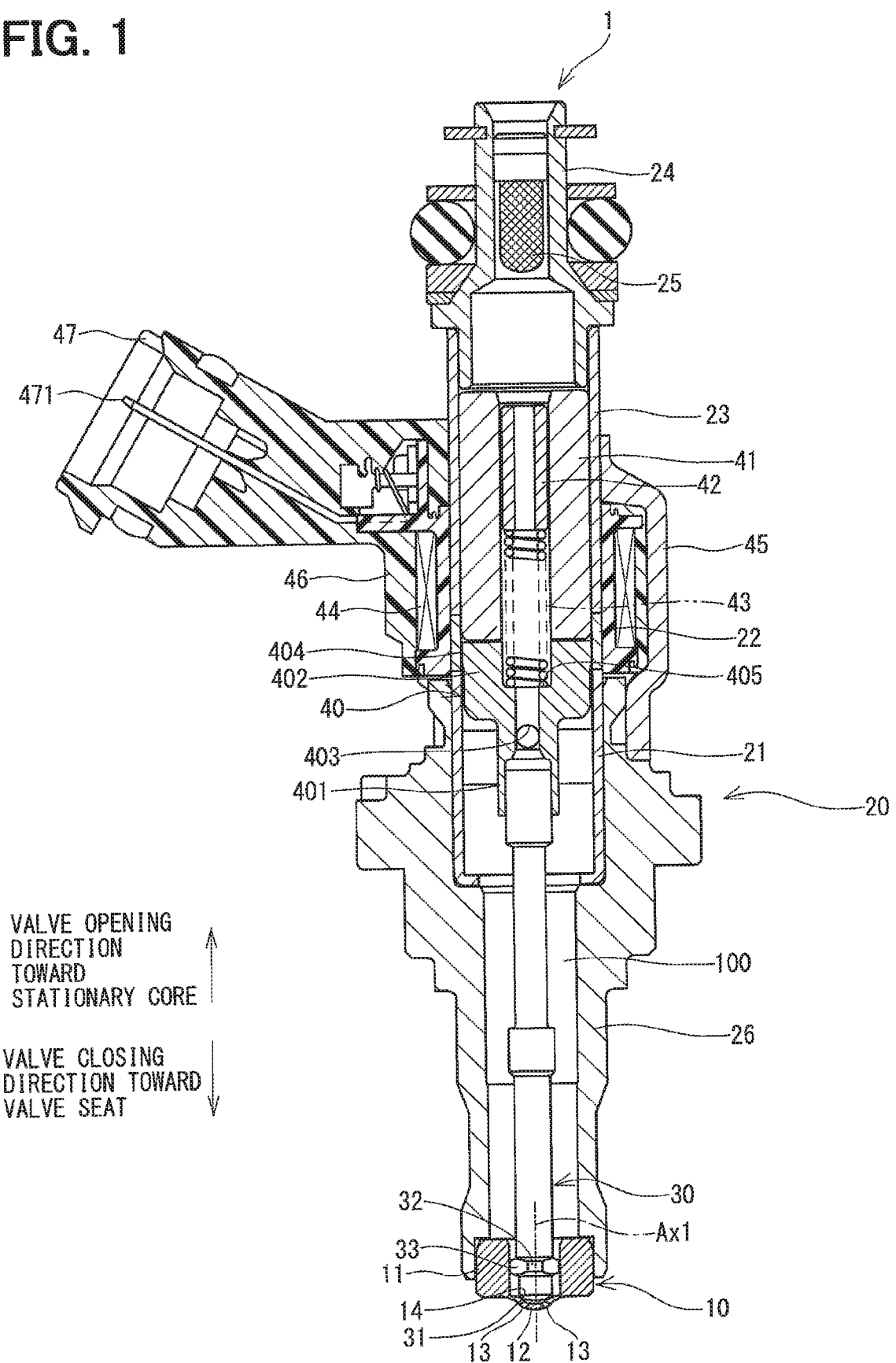
FIG. 1 is a sectional view illustrating a fuel injection device of a first embodiment of the present disclosure.

Hereinafter, a plurality of embodiments of the present disclosure are described with reference to drawings. In the embodiments, substantially the same components are designated by the same reference numeral, and duplicated description is omitted.

First Embodiment

FIG. 1 illustrates a fuel injection device of a first embodiment of the present disclosure. A fuel injection device 1 is applied to, for example, a gasoline engine (hereinafter simply referred to as "engine") 80 as an internal combustion engine, and injects and supplies gasoline as a fuel into the engine 80 (see FIG. 2).

Figure 2:
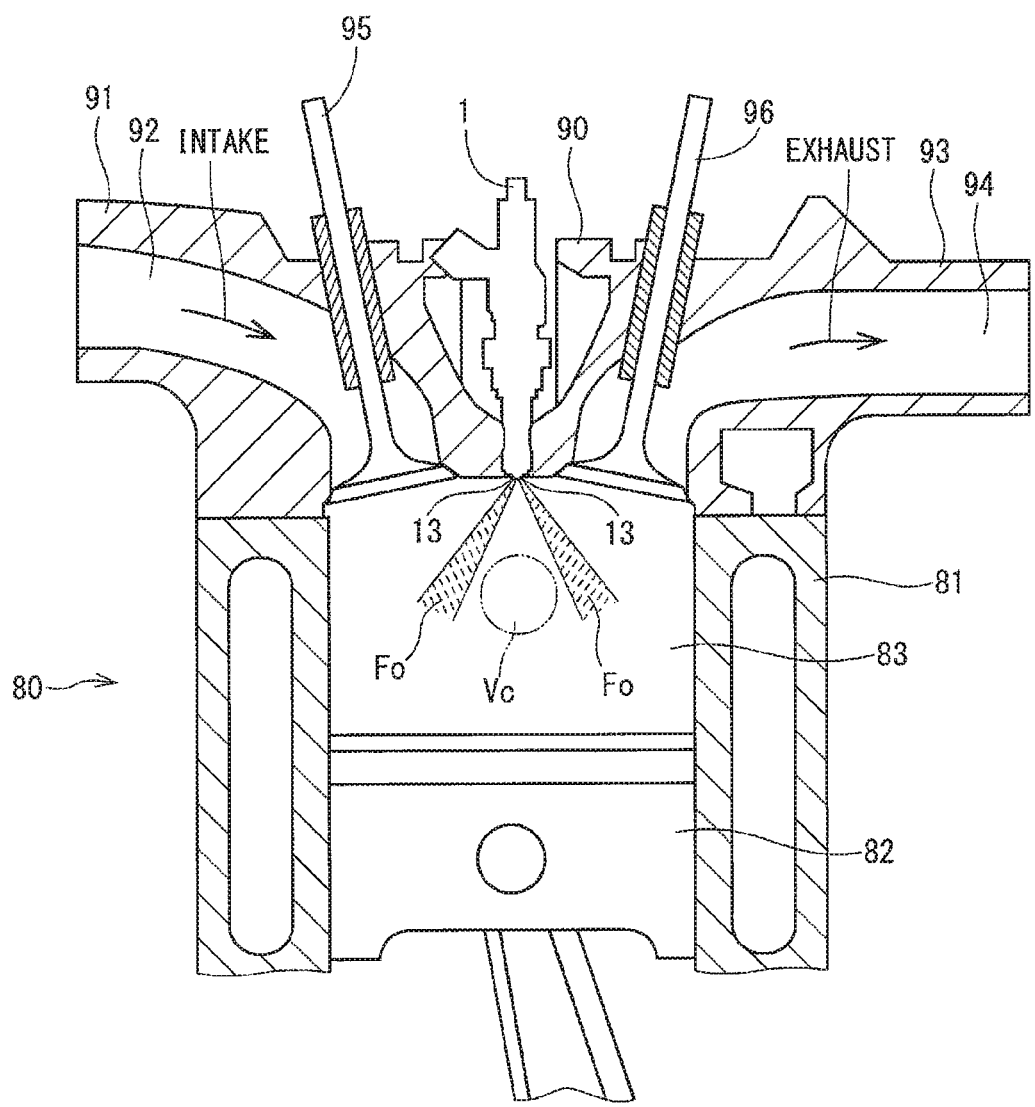
FIG. 2 is a view illustrating a state in which the fuel injection device of the first embodiment of the present disclosure is applied to an internal combustion engine.

As shown in FIG. 2, the engine 80 includes a cylindrical cylinder block 81, a piston 82, a cylinder head 90, an intake valve 95, an exhaust valve 96, and the like. The piston 82 is provided so as to be able to reciprocate within the cylinder block 81. The cylinder head 90 is provided so as to close an open end of the cylinder block 81. A combustion chamber 83 is formed by the inner wall of the cylinder block 81, a wall surface of the cylinder head 90, and the piston 82. The volume of the combustion chamber 83 increases and decreases with reciprocation of the piston 82.

The cylinder head 90 has an intake manifold 91 and an exhaust manifold 93. An intake passage 92 is provided in the intake manifold 91. The intake passage 92 has one end open to the atmosphere side and the other end communicating with the combustion chamber 83. The intake passage 92 guides the air (hereinafter referred to as "intake") inhaled from the atmosphere side to the combustion chamber 83.

An exhaust passage 94 is provided in the exhaust manifold 93. The exhaust passage 94 has one end communicating with the combustion chamber 83 and the other end open to the atmosphere side. The exhaust passage 94 guides the air (hereinafter referred to as "exhaust") containing combustion gas generated in the combustion chamber 83 to the atmosphere side.

The intake valve 95 is provided in the cylinder head 90 so as to be able to reciprocate by rotation of a cam of a driven shaft that rotates in conjunction with an undepicted driving shaft. The intake valve 95 can reciprocate so as to open and close between the combustion chamber 83 and the intake passage 92. The exhaust valve 96 is provided in the cylinder head 90 so as to be able to reciprocate by rotation of a cam. The exhaust valve 96 can reciprocate so as to open and close between the combustion chamber 83 and the exhaust passage 94.

The fuel injection device 1 is mounted between the intake valve 95 and the exhaust valve 96 of the cylinder head 90, i.e., mounted at a position corresponding to the center of the combustion chamber 83. The fuel injection device 1 is provided such that its axis is substantially parallel to or substantially coincident with the axis of the combustion chamber 83. In the first embodiment, the fuel injection device 1 is center-mounted in the engine 80. An undepicted ignition plug is provided on the cylinder head 90. The ignition plug is provided at a position at which combustible fuel-mixed air can be ignited while the fuel injected from the fuel injection device 1 does not directly adhere to the ignition plug. As described above, the engine 80 is a direct-injection gasoline engine.

The fuel injection device 1 is provided such that a plurality of injection holes 13 are exposed in a portion of the combustion chamber 83 on a side axially opposite to the piston 82. Fuel pressurized to a fuel injection pressure by an undepicted fuel pump is supplied to the fuel injection device 1. Conical sprays Fo are injected into the combustion chamber 83 from the injection holes 13 of the fuel injection device 1. When the sprays Fo are injected from the injection holes 13, a negative pressure Vc is generated between the sprays Fo. As a result, the sprays Fo are attracted to each other. This phenomenon is known as the Coanda effect.

A basic configuration of the fuel injection device 1 is now described with reference to FIG. 1.

The fuel injection device 1 includes a nozzle part 10, a housing 20, a needle 30, a movable core 40, a stationary core 41, a spring 43 as a valve-seat-side biasing component, a coil 44, and the like.

The nozzle part 10 is made of a metal such as martensitic stainless steel, for example. The nozzle part 10 is hardened so as to have a predetermined hardness. As shown in FIG. 1, the nozzle part 10 has a nozzle cylinder portion 11, a nozzle bottom portion 12, an injection hole 13, and a valve seat 14.

The nozzle cylinder portion 11 has a cylindrical shape. The nozzle bottom portion 12 closes one end of the nozzle cylinder portion 11. Each injection hole 13 is formed so as to connect a surface 121 (inner wall) of the nozzle bottom portion 12 on a side close to the nozzle cylinder portion 11 to a surface 122 (outer wall) of the nozzle bottom portion 12 on a side opposite to the nozzle cylinder portion 11 (see FIG. 3A). A plurality of injection holes 13 are provided in the nozzle bottom portion 12. In the first embodiment, six injection holes 13 are provided (see FIG. 3B). The valve seat 14 is annularly formed around the injection holes 13 on the nozzle bottom portion 12 on the side close to the nozzle cylinder portion 11. The injection holes 13 are described in detail later.

The housing 20 has a nozzle holder 26, a first cylindrical component 21, a second cylindrical component 22, a third cylindrical component 23, an inlet part 24, a filter 25, and the like.

The nozzle holder 26 is formed in a cylindrical shape with a magnetic material such as ferritic stainless steel, for example. An end portion of the nozzle cylinder portion 11 on a side opposite to the nozzle bottom portion 12 is connected to the inside of one end of the nozzle holder 26. The nozzle holder 26 is joined to the nozzle part 10 by welding, for example. Thus, the nozzle holder 26 holds the nozzle part 10.

The first cylindrical component 21, the second cylindrical component 22, and the third cylindrical component 23 are each formed in a substantially cylindrical shape. The first cylindrical component 21, the second cylindrical component 22, and the third cylindrical component 23 are disposed in this order so as to be coaxial with one another, and are connected to one another.

The first cylindrical component 21 and the third cylindrical component 23 are made of a magnetic material such as ferritic stainless steel, for example, and are magnetically stabilized. The first cylindrical component 21 and the third cylindrical component 23 each have a relatively low hardness. The second cylindrical component 22 is made of a nonmagnetic material such as austenitic stainless steel, for example. Hardness of the second cylindrical component 22 is higher than hardness of each of the first and third cylindrical components 21 and 23.

The first cylindrical component 21 is provided such that the outer wall at the end portion thereof on a side opposite to the second cylindrical component 22 is fitted in the inner wall at the end portion of the nozzle holder 26 on a side opposite to the nozzle part 10.

The inlet part 24 is formed in a cylindrical shape with a magnetic material such as ferritic stainless steel, for example. The inlet part 24 is provided such that its one end is connected to the end portion of the third cylindrical component 23 on a side opposite to the second cylindrical component 22.

A fuel passage 100 is provided within the housing 20. The fuel passage 100 communicates with the injection holes 13. That is, the nozzle cylinder portion 11 internally forms a fuel passage 100. An undepicted pipe is connected to the inlet part 24 on a side opposite to the third cylinder component 23. As a result, fuel from a fuel supply source (fuel pump) flows into the fuel passage 100 through the pipe. The fuel passage 100 guides the fuel to the injection holes 13.

The filter 25 is provided in the inlet part 24. The filter 25 collects foreign matters in the fuel flowing into the fuel passage 100.

The needle 30 is formed in a rod shape with a metal such as martensitic stainless steel, for example. The needle 30 is hardened so as to have a predetermined hardness. Hardness of the needle 30 is set substantially equal to hardness of the nozzle part 10.

The needle 30 is accommodated in the housing 20 so as to be able to reciprocate within the fuel passage 100 in the axial direction of the housing 20. The needle 30 has a seat portion 31, a large diameter portion 32, and the like.

The seat portion 31 is formed at the end portion of the needle 30 on a side close to the nozzle part 10 while being contactable with the valve seat 14.

The large diameter portion 32 is formed in the vicinity of the seat portion 31 at an end portion of the needle 30 on a side close to the valve seat 14. The outer diameter of the large diameter portion 32 is set larger than the outer diameter of the end portion of the needle 30 on the side close to the valve seat 14. The large diameter portion 32 is formed such that its outer wall slides on the inner wall of the nozzle cylinder portion 11 of the nozzle part 10. This allows guide of axial reciprocation of the end portion of the needle 30 on the side close to the valve seat 14. The large diameter portion 32 has notches 33 so as to be cut out at a plurality of positions of its outer wall in the circumferential direction. As a result, the fuel can flow between the notches 33 and the inner wall of the nozzle cylinder portion 11.

The needle 30 opens or closes the injection holes 13 through separation (leaving) of the seat portion 31 from the valve seat 14 or contact (seating) of the seat portion 31 with (on) the valve seat 14. Hereinafter, the direction in which the needle 30 separates from the valve seat 14 is referred to as valve opening direction, and the direction in which the needle 30 comes into contact with the valve seat 14 is referred to as valve closing direction.

The movable core 40 is formed in a cylindrical shape with a magnetic material such as ferritic stainless steel, for example. The movable core 40 is magnetically stabilized. Hardness of the movable core 40 is relatively low, and is roughly equal to hardness of the first cylindrical component 21 or the third cylindrical component 23 of the housing 20.

The movable core 40 has a first cylindrical portion 401 and a second cylindrical portion 402. The first cylindrical portion 401 and the second cylindrical portion 402 are integrally formed so as to be coaxial with each other. The first cylindrical portion 401 is provided such that the inner wall at one end thereof is fitted in the outer wall at the end portion of the needle 30 on the side opposite to the valve seat 14. In the first embodiment, the movable core 40 is joined to the needle 30 by welding. The movable core 40 can therefore axially reciprocate together with the needle 30 within the housing 20.

The second cylindrical portion 402 is connected to the other end of the first cylindrical portion 401. The outer diameter of the second cylindrical portion 402 is set larger than the outer diameter of the first cylindrical portion 401.

The first cylindrical portion 401 has a radial hole portion 403 extending radially so as to connect between the inner wall and the outer wall. This allows circulation of fuel between inside and outside the first cylindrical portion 401 (the movable core 40) through the radial hole portion 403.

The movable core 40 has a protruding portion 404 formed so as to annularly protrude in a radially outward direction from the outer wall of the end portion of the second cylindrical portion 402 on a side opposite to the first cylindrical portion 401. The outer wall of the protruding portion 404 is slidable with the inner wall of the second cylindrical component 22 of the housing 20. Hence, the axial reciprocation of the movable core 40 is guided by the inner wall of the second cylindrical component 22. That is, the axial reciprocation of the needle 30 and the movable core 40 in the fuel passage 100 is guided by the inner wall of the nozzle cylinder portion 11 and the inner wall of the second cylinder component 22. The movable core 40 has a stepped surface 405 formed in an annular and planar shape in the second cylindrical portion 402.

The stationary core 41 is formed in a substantially cylindrical shape with a magnetic material such as ferritic stainless steel, for example. The stationary core 41 is magnetically stabilized. Hardness of the stationary core 41 is relatively low, and is roughly equal to hardness of the movable core 40. The stationary core 41 is provided on the opposite side of the valve seat 14 from the movable core 40. The stationary core 41 is provided within the housing 20 so that its outer wall is connected to the respective inner walls of the second and third cylindrical components 22 and 23. The end surface of the stationary core 41 on the side close to the valve seat 14 is contactable with the end surface of the movable core 40 on the side close to the stationary core 41.

A cylindrical adjusting pipe 42 is provided by press fitting in the stationary core 41.

The spring 43 is, for example, a coil spring, and is provided between the adjusting pipe 42 in the stationary core 41 and the stepped surface 405 of the movable core 40. One end of the spring 43 is in contact with the adjusting pipe 42. The other end of the spring 43 is in contact with the stepped surface 405. The spring 43 can bias the movable core 40 together with the needle 30 toward the valve seat 14, i.e., in the valve closing direction. The biasing force of the spring 43 is adjusted by a position of the adjusting pipe 42 with respect to the stationary core 41.

The coil 44 has a substantially cylindrical shape and is provided so as to surround the radially outer sides of, specifically, the second cylindrical component 22 and the third cylindrical component 23 of the housing 20. A cylindrical holder 45 is provided radially outside the coil 44 so as to cover the coil 44. The holder 45 is made of a magnetic material such as ferritic stainless steel, for example. The inner wall of the holder 45 is connected to the outer wall of the nozzle holder 26 at one end of the holder 45 and connected to the outer wall of the third cylindrical component 23 at the other end thereof.

When electric power is supplied to the coil 44, the coil 44 generates a magnetic force. When the coil 44 generates a magnetic force, a magnetic circuit is formed over the stationary core 41, the movable core 40, the first cylindrical component 21, the nozzle holder 26, the holder 45, and the third cylindrical component 23. As a result, a magnetic attractive force is generated between the stationary core 41 and the movable core 40, and the movable core 40 is attracted together with the needle 30 toward the stationary core 41. Consequently, the needle 30 moves in the valve opening direction, and the seat portion 31 separates from the valve seat 14, leading to valve opening. As a result, the injection holes 13 are opened. In this way, when the coil 44 is energized, it is possible to attract the movable core 40 toward the stationary core 41 and move the needle 30 to the side opposite to the valve seat 14.

When the movable core 40 is attracted toward the stationary core 41 (in the valve opening direction) by the magnetic attractive force, the end surface of the movable core 40 on the side close to the stationary core 41 collides with the end surface of the stationary core 41 on a side close to movable core 40. Consequently, movement of the movable core 40 in the valve opening direction is restricted.

When energization of the coil 44 is stopped in a state where the movable core 40 is attracted toward the stationary core 41, the needle 30 and the movable core 40 are biased toward the valve seat 14 by the biasing force of the spring 43. Consequently, the needle 30 moves in the valve closing direction, and the seat portion 31 comes into contact with the valve seat 14, leading to valve closing. As a result, the injection holes 13 are closed.

As shown in FIG. 1, the radially outer sides of the third cylindrical component 23 and the coil 44 are molded by a resin-made molded portion 46. A connector portion 47 is formed so as to protrude radially outward from the molded portion 46. A terminal 471 for supplying electric power to the coil 44 is insert-molded in the connector portion 47.

Fuel flowing in from the inlet portion 24 flows through the filter 25, the insides of the stationary core 41 and the adjusting pipe 42, the spring 43, the inside of the movable core 40, the radial hole portion 403, the space between the needle 30 and the inner wall of the housing 20, and the space between the needle 30 and the inner wall of the nozzle cylinder part 11, i.e., the fuel passage 100, and is thus guided into the injection holes 13. The surroundings of the movable core 40 and the needle 30 are filled with the fuel during operation of the fuel injection device 1. In addition, the fuel flows through the radial hole portion 403 of the movable core 40 during operation of the fuel injection device 1. As a result, the movable core 40 and the needle 30 can smoothly reciprocate in the axial direction within the housing 20.

The injection hole 13 of the first embodiment is now described in detail with reference to FIGS. 3A to 6.

Figure 3A:
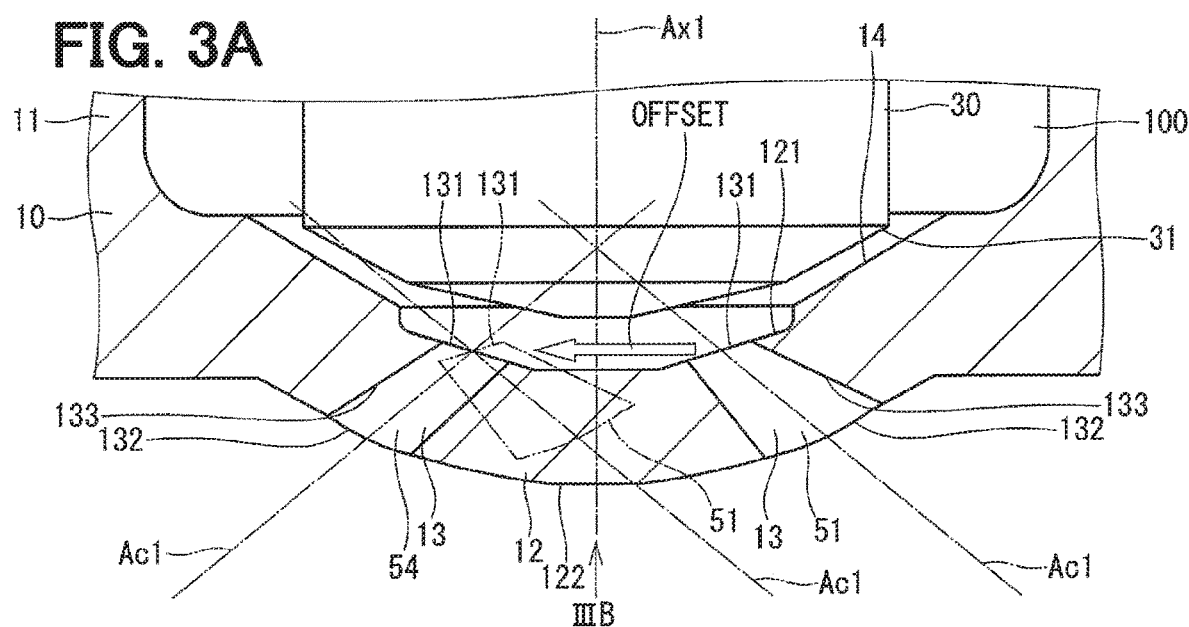
FIG. 3A is a sectional view illustrating an injection hole of the fuel injection device of the first embodiment of the present disclosure and the vicinity of the injection hole.

As shown in FIG. 3A, the injection hole 13 has an inlet opening 131, an outlet opening 132, and an injection hole inner wall 133. The inlet opening 131 is provided in a surface 121 of the nozzle bottom portion 12 on the side close to the nozzle cylinder portion 11. The outlet opening 132 is provided in a surface 122 of the nozzle bottom portion 12 on the side opposite to the nozzle cylinder portion 11. A portion of the surface 121, in which the inlet opening 131 is formed, has a tapered shape so as to approach the axis Ax1 of the nozzle cylinder portion 11 as going from a side close to the nozzle cylinder portion 11 to the side opposite to the nozzle cylinder portion 11. A portion of the surface 122, in which the outlet opening 132 is formed, has a curved surface shape. The injection hole inner wall 133 is connected to the inlet opening 131 and the outlet opening 132, and has a tapered shape so as to be gradually away from the central axis Ac1 as going from the inlet opening 131 toward the outlet opening 132. In the first embodiment, any of the injection holes 13 is formed such that the central axis Ac1 obliquely intersects the axis Ax1 of the nozzle cylinder portion 11.

Figure 3B:
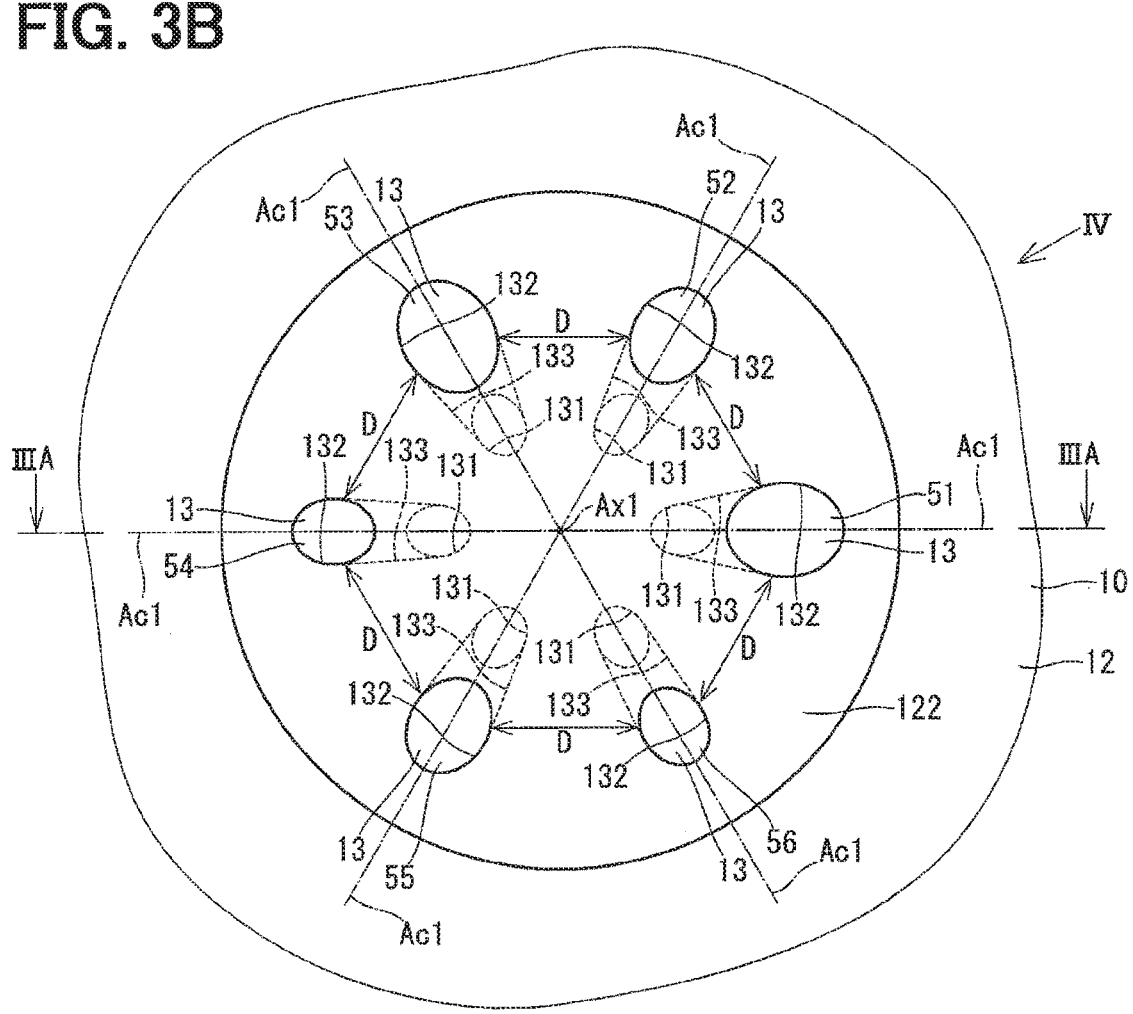
FIG. 3B is a view of FIG. 3A as seen from the direction of arrow IIIB.

As shown in FIG. 3B, in the first embodiment, six injection holes 13 are provided at equal intervals in the circumferential direction of the nozzle bottom portion 12. In other words, the six injection holes 13 are provided at an interval of 60° in the circumferential direction of the nozzle bottom portion 12. The respective six injection holes 13 are assumed to be injection holes 51, 52, 53, 54, 55, and 56 for explanation.

In the first embodiment, the injection holes 51, 52, 53, 54, 55, and 56 are formed so as to be arranged in this order in the circumferential direction of the nozzle bottom portion 12 (see FIG. 3B). In other words, the injection holes 51 and 54, 52 and 55, and 53 and 56 are each provided in the nozzle bottom portion 12 so as to be opposed with respect to the axis Ax1 of the nozzle cylinder portion 11 (see FIGS. 3A and 3B).

In the first embodiment, sizes of the inlet openings 131 of the injection holes 51 to 56 are substantially the same. The sizes of the outlet openings 132 of the injection holes 51 and 53 are equal to each other. The sizes of the outlet openings 132 of the injection holes 52 and 55 are equal to each other, and that size is smaller than the size of the outlet opening 132 of the injection hole 51 or 53. The sizes of the outlet openings 132 of the injection holes 54 and 56 are equal to each other, and that size is smaller than the size of the outlet opening 132 of the injection hole 52 or 55.

Taper angles, which are formed by the contours of the injection hole inner walls 133 in the cross sections along the virtual planes including the central axes Ac1 of the injection holes 51 and 53, are equal to each other. Taper angles, which are formed by the contours of the injection hole inner walls 133 in the cross sections along the virtual planes including the central axes Ac1 of the injection holes 52 and 55, are equal to each other, and that taper angle is smaller than the taper angle of the injection hole 51 or 53. Taper angles, which are formed by the contours of the injection hole inner walls 133 in the cross sections along the virtual planes including the central axes Ac1 of the injection holes 54 and 56, are equal to each other, and that taper angle is smaller than the taper angle of the injection hole 52 or 55.

As shown in FIGS. 3A and 3B, in the first embodiment, among all combinations of two injection holes, in a combination (in the first embodiment, a combination of the injection holes 51 and 52, 52 and 53, 53 and 54, 54 and 55, 55 and 56, or 56 and 51) in which when the injection holes are offset such that their central axes Ac1 are coincident with each other in the inlet openings 131, an inter-injection hole angle formed by the central axes Ac1 is minimized, the inter-injection hole angle between the two injection holes 13 is represented as γamin[deg], taper angles, which are formed by the respective contours of the injection hole inner walls 133 in the cross sections along the virtual planes including the central axes Ac1 of the two injection holes 13 (injection holes 51 and 52, 52 and 53, 53 and 54, 54 and 55, 55 and 56, or 56 and 51) that allow the inter-injection hole angle to be minimized, are represented as θa1 and θa2[deg], and when the fuel is injected from the injection hole 13, the average pressure of the fuel in the fuel passage 100 is represented as P[Mpa], and the injection holes 13 (injection holes 51 to 56) are formed so as to satisfy the following relationship.

$$\gamma a\min \geq \theta a1 + \theta a2 + 0.5 \times P^{0.6} \quad \text{(formula 1)}$$

Figure 4:
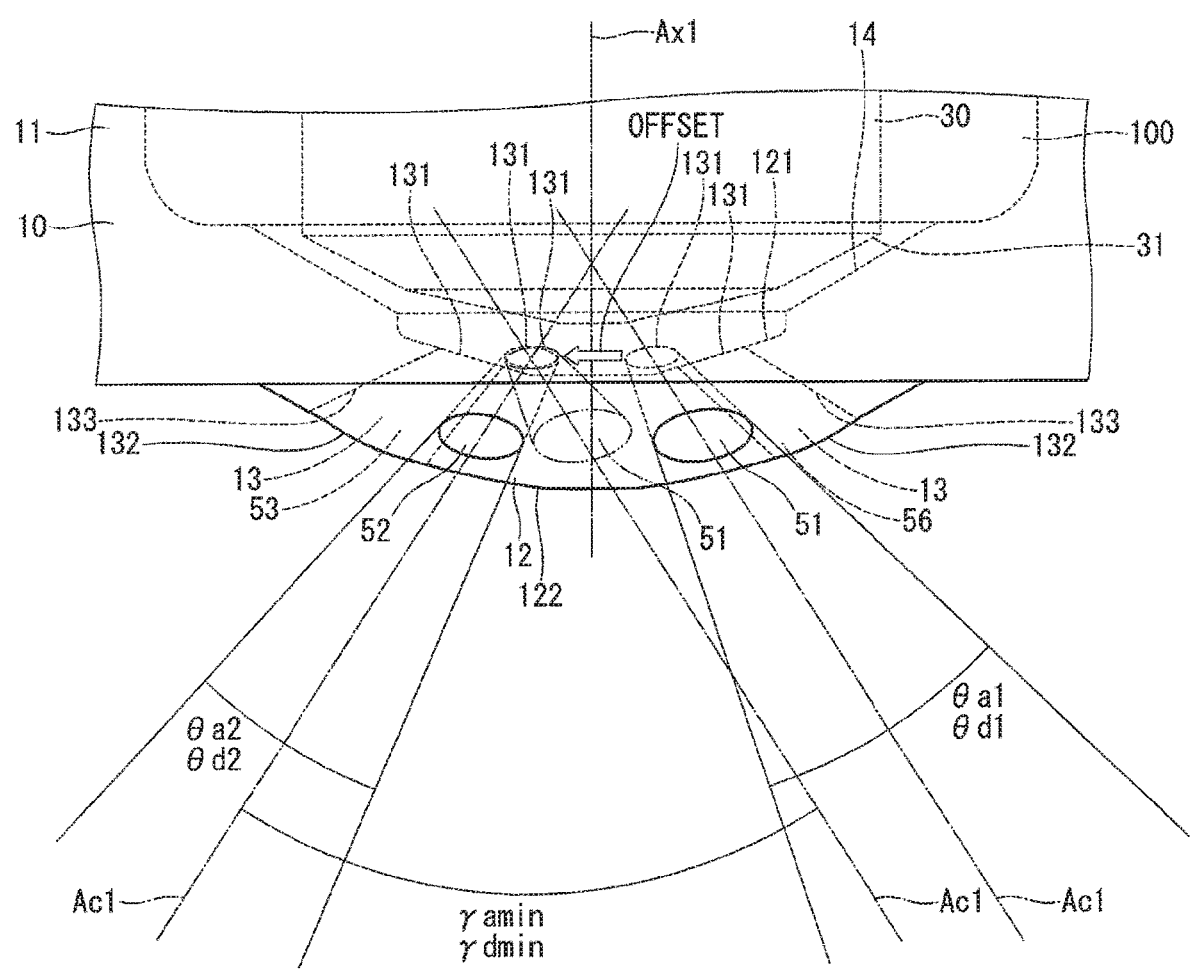
FIG. 4 is a view of FIG. 3B as seen from the direction of arrow IV.

FIG. 4 shows a shape relationship between the injection holes 51 and 52 with the combination of the injection holes 51 and 52 as an example among the combinations of the two injection holes 13 allowing the inter-injection hole angle to be minimized. When the injection holes 51 and 52 are offset such that their central axes Ac1 are coincident with each other in the inlet openings 131, an inter-injection hole angle formed by the central axes Ac1 corresponds to γamin. The injection holes 51 and 52 are formed so as to satisfy the relationship of the formula 1.

From the formula 1, $\gamma a\min - (\theta a1 + \theta a2) \geq 0.5 \times P^{0.6}$ is given.

The assumed pressure of the fuel in the fuel passage 100 during use of the fuel injection device 1 of the first embodiment is, for example, about 20 MPa. In the first embodiment, therefore, P is 20[Mpa], and $0.5 \times P^{0.6}$ is about 3.0.

In the first embodiment, the taper angles of the injection holes 51 to 56 are each set to, for example, about 14 to 18[deg]. Since FIGS. 3A, 3B, and 4 are schematic diagrams, the taper angle of each injection hole is not accurately represented.

In the first embodiment, all of the combinations of the injection holes 51 and 52, 52 and 53, 53 and 54, 54 and 55, 55 and 56, and 56 and 51 are formed so as to satisfy the relationship of the formula 1.

As shown in FIGS. 3A and 4, the inter-injection hole angle between the injection holes 51 and 54 is larger than γamin.

As shown in FIGS. 3A and 3B, in the first embodiment, among all combinations of two injection holes 13, in a combination in which a distance D between the outlet openings 132 is minimized (in the first embodiment, a combination of the injection holes 51 and 52 or 52 and 53), when the injection holes 13 are offset such that their central axes Ac1 are coincident with each other in the inlet openings 131, an inter-injection hole angle formed by the central axes Ac1 is represented as γdmin [deg], taper angles, which are formed by the respective contours of the injection hole inner walls 133 in the cross sections along the virtual planes including the central axes Ac1 of the two injection holes 13 (injection holes 51 and 52 or 52 and 53) that allow the distance D between the outlet openings 132 to be minimized, are represented as θd1 and θd2 [deg], and when the fuel is injected from the injection hole 13, an average pressure of the fuel in the fuel passage is represented as P [Mpa], and the injection holes 13 (injection holes 51 to 56) are formed so as to satisfy the following relationship.

$$\gamma d\min \geq \theta d1 + \theta d2 + 0.5 \times P^{0.6} \quad \text{(formula 2)}$$

FIG. 4 shows a shape relationship between the injection holes 51 and 52 with the combination of the injection holes 51 and 52 as an example among the combinations of the two injection holes 13 allowing the distance D between the outlet openings 132 to be minimized. When the injection holes 51 and 52 are offset such that their central axes Ac1 are coincident with each other in the inlet openings 131, an inter-injection hole angle formed by the central axes Ac1 corresponds to γdmin. The injection holes 51 and 52 are formed so as to satisfy the relationship of the formula 2.

From the formula 2, γdmin−(θa1+θa2)≥0.5×P$^{0.6}$ is given.

In the first embodiment, the injection holes 51 and 52 as well as 52 and 53 are formed so as to satisfy the relationship of the formula 2.

In the first embodiment, γamin is equal to γdmin (see FIG. 4). As shown in FIGS. 3A and 4, the inter-injection hole angle between the injection holes 51 and 54 is larger than γdmin.

Figure 5:
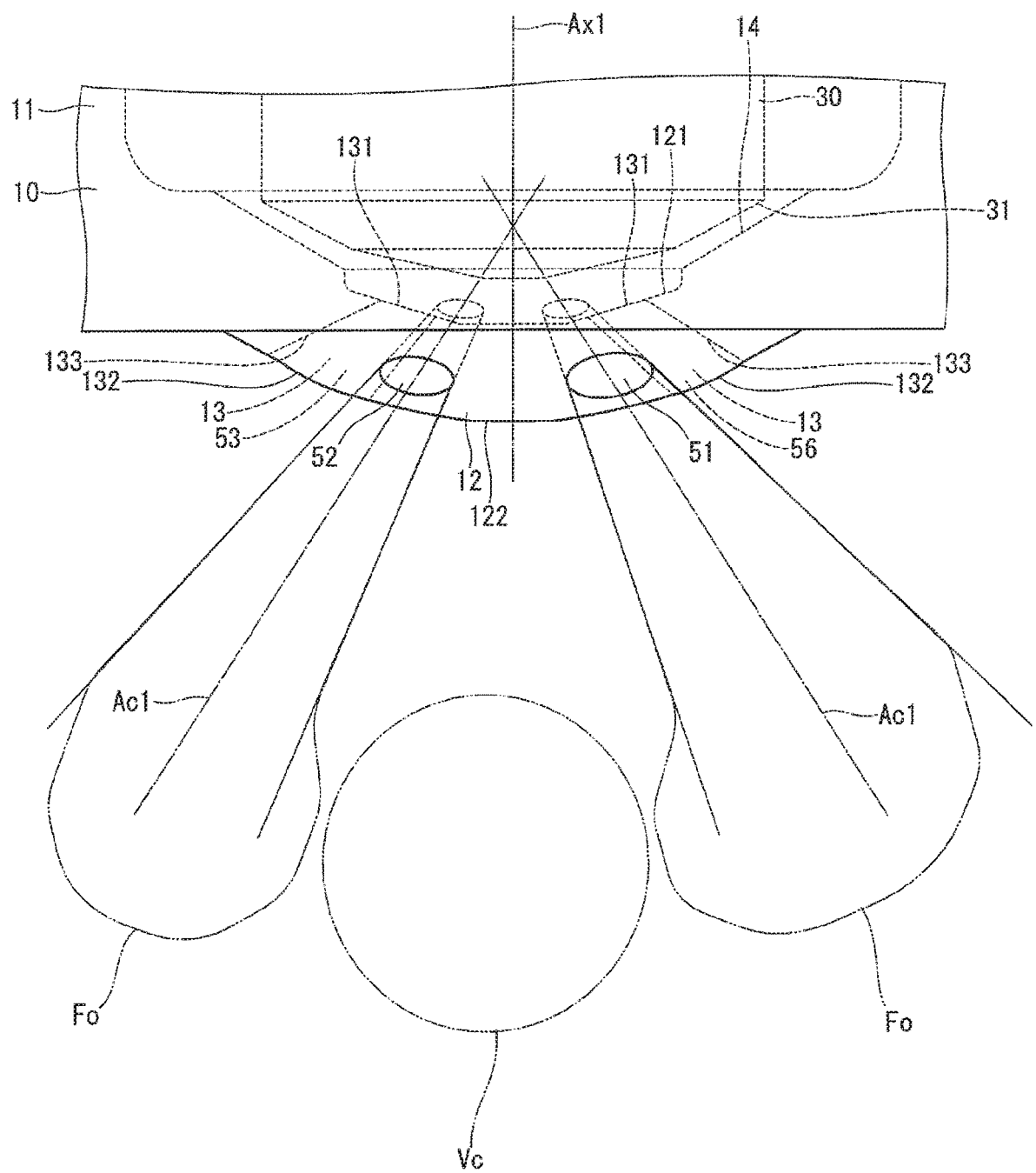
FIG. 5 is a view of FIG. 3 (B) as seen in the direction of arrow IV, showing a state where a fuel spray is injected from the injection hole.

As shown in FIG. 5, in the first embodiment, for example, when the fuel is injected from the injection holes 51 and 52, a negative pressure Vc is generated between the respective sprays Fo, and the sprays Fo are thus attracted to each other by the Coanda effect. However, in the first embodiment, the injection holes 51 and 52 are each formed so as to satisfy the formulas 1 and 2. Specifically, the inter-injection hole angle between the two injection holes 13 (injection holes 51, 52) is set based on the formulas 1 and 2 to a value that is less likely to be affected by the Coanda effect depending on the assumed pressure of the fuel in the fuel passage 100 during use of the fuel injection device 1. It is therefore possible to reduce the influence of the Coanda effect on the fuel sprays Fo injected from the two injection holes 13 (injection holes 51, 52) during use of the fuel injection device 1.

Figure 6:
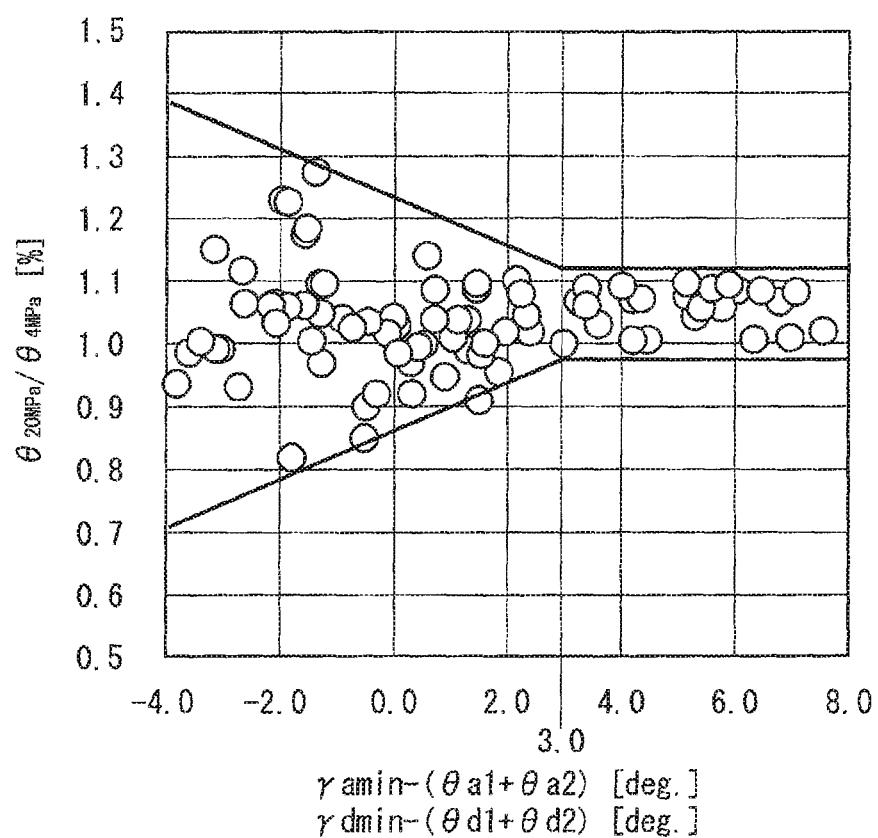
FIG. 6 is a graph showing a relationship between γamin−(θa1+θa2) or γdmin−(θd1+θd2) and influence rate of the Coanda effect.

FIG. 6 shows a relationship between γamin−(θa1+θa2) or γdmin−(θd1+θd2) and the influence rate of the Coanda effect in the first embodiment, i.e., in the case where the assumed pressure of the fuel in the fuel passage 100 during use of the fuel injection device 1 is about 20 MPa. FIG. 6 shows the experimental results of fuel injection from the fuel injection device 1 by plotting a plurality of circles.

In general, as the pressure of the injected fuel (pressure of the fuel in the fuel passage 100) is higher, the influence of the Coanda effect increases. When the pressure of the fuel in the fuel passage 100 is, for example, about 4 MPa, the influence of the Coanda effect is almost negligible. In FIG. 6, therefore, the influence rate of the Coanda effect (hereinafter appropriately referred to as "Coanda influence rate") is defined as a ratio of "angle θ20 MPa at which the spray Fo is attracted (spreads) at P of 20 Mpa" to "angle 64 MPa at which the spray Fo is attracted (spreads) at P of 4 Mpa", and the ratio is plotted along the ordinate.

As shown in FIG. 6, when γamin−(θa1+θa2) or γdmin−(θd1+θd2) is larger than 3.0, the Coanda influence rate is about 1.0 to 1.1. On the other hand, when γamin−(θa1+θa2) or γdmin−(θd1+6d2) is 3.0 or less, the Coanda influence rate is 0.8 to 1.3, showing that as γamin−(θa1+θa2) or γdmin−(θd1+6d2) decreases, the Coanda influence rate tends to increase. In other words, when γamin−(θa1+θa2) or γdmin−(θd1+6d2) is larger than 3.0, the effect of Coanda effect on the spray Fo is small. In the first embodiment, the injection hole 13 is formed such that γamin−(θa1+θa2) and γdmin−(θd1+6d2) are each 0.5×P$^{0.6}$ or more, i.e., about 3.0 or more. Consequently, the Coanda effect has a small influence on the spray Fo injected from the injection hole 13.

As described above, the fuel injection device 1 of the first embodiment has the nozzle part 10. The nozzle part 10 includes the nozzle cylinder portion 11 internally forming the fuel passage 100, the nozzle bottom portion 12 closing one end of the nozzle cylinder portion 11, and the plurality of injection holes 13 (injection holes 51 to 56) that connect between the surface 121 of the nozzle bottom portion 12 on the side close to the nozzle cylinder portion 11 and the surface 122 on the side opposite to the nozzle cylinder portion 11, and inject the fuel in the fuel passage 100.

The injection hole 13 has the inlet opening 131 formed in the surface 121 of the nozzle bottom portion 12 on the side close to nozzle cylinder portion 11, the outlet opening 132 formed in the surface 122 of the nozzle bottom portion 12 on the side opposite to the nozzle cylinder portion 11, and the injection hole inner wall 133 that is connected to the inlet opening 131 and the outlet opening 132 and has a tapered shape so as to be gradually away from the central axis Ac1 as going from the inlet opening 131 toward the outlet opening 132. Hence, the fuel spray Fo injected from the injection hole 13 spreads so as to be gradually away from the central axis Ac1 of the injection hole 13. As a result, atomization of the fuel spray can be achieved.

Among all combinations of two injection holes, in a combination in which when the injection holes are offset such that their central axes Ac1 are coincident with each other in the inlet openings 131, an inter-injection hole angle formed by the central axes Ac1 is minimized, the inter-injection hole angle between the two injection holes 13 is represented as γamin[deg], taper angles, which are formed by the respective contours of the injection hole inner walls 133 in the cross sections along the virtual planes including the central axes Ac1 of the two injection holes 13 that allow the inter-injection hole angle to be minimized, are represented as θa1 and θa2[deg], and when the fuel is injected from the injection hole 13, the average pressure of the fuel in the fuel passage 100 is represented as P[Mpa], and the injection holes 13 are formed so as to satisfy the following relationship $$\gamma a\min \geq \theta a1+\theta a2+0.5\times P^{0.6} \qquad \text{(formula 1)}$$

In the first embodiment, among all combinations of two injection holes 13, in a combination in which a distance D between the outlet openings 132 is minimized, when the injection holes 13 are offset such that their central axes Ac1 are coincident with each other in the inlet openings 131, an inter-injection hole angle formed by the central axes Ac1 is represented as γdmin[deg], taper angles, which are formed by the respective contours of the injection hole inner walls 133 in the cross sections along the virtual planes including the central axes Ac1 of the two injection holes 13 that allow the distance D between the outlet openings 132 to be minimized, are represented as θd1 and θd2 [deg], and when the fuel is injected from the injection hole 13, the average pressure of the fuel in the fuel passage 100 is represented as P[Mpa], and the injection holes 13 are formed so as to satisfy the following relationship.

$$\gamma d\min \geq \theta d1+\theta d2+0.5\times P^{0.6} \qquad \text{(formula 2)}$$

As described above, in the first embodiment, the inter-injection hole angle between the two injection holes 13 in the combination in which the inter-injection hole angle is minimized, and the inter-injection hole angle between the two injection holes 13 in the combination, in which the distance D between the outlet openings 132 is minimized, are set based on the formulas 1 and 2 to values that are each less likely to be affected by the Coanda effect depending on the assumed pressure of the fuel in the fuel passage 100 during use of the fuel injection device 1. Hence, if the pressure of the fuel in the fuel passage100 is within the assumed range during use of the fuel injection device 1, the influence of the Coanda effect on the fuel injection device 1, the influence of the Coanda effect on the fuel sprays Fo injected from the two injection holes 13 can be reduced. This makes it possible to improve robustness of the spray shape against variations in atmospheric pressure or ambient temperature. In addition, it is possible to suppress collision between the fuel sprays due to the Coanda effect and promote atomization of the fuel spray. It is therefore possible to reduce unburned fuel and improve fuel economy.

In the first embodiment, the nozzle part 10 has six injection holes 13. In general, a larger number of injection holes tend to reduce the angle formed by the central axes of the injection holes, or reduce the distance between the outlet openings of the injection holes, leading to a fear of an increase in the Coanda effect on the injected fuel spray. As described above, in the first embodiment, the inter-injection hole angle between the injection holes 13 is set based on the formula 1 or 2 to a value that is less likely to be affected by the Coanda effect depending on the assumed pressure of the fuel in the fuel passage 100 during use of the fuel injection device 1. Hence, even when the nozzle part 10 has many injection holes 13, it is possible to reduce the influence of the Coanda effect on the sprays Fo injected from the injection holes 13.

In the first embodiment, the nozzle part 10 has the valve seat 14 annularly formed around the inlet openings 131 of the nozzle bottom portion 12. Further, the fuel injection device 1 includes the housing 20, the needle 30, the movable core 40, the stationary core 41, the coil 44, and the spring 43.

The housing 20 has a cylindrical shape and is connected to the nozzle cylinder portion 11 on the side opposite to the nozzle bottom portion 12. The needle 30 is provided within the housing 20 such that its one end (seat portion 31) is contactable with the valve seat 14 and able to reciprocate in the axial direction, and when the one end separates from or comes into contact with the valve seat 14, the injection holes 13 are opened or closed. The movable core 40 is provided so as to be able to reciprocate together with the needle 30 within the housing 20. The stationary core 41 is provided within the housing 20 on the opposite side of the movable core 40 from the valve seat 14. When energized, the coil 44 can attract the movable core 40 toward the stationary core 41 to move the needle 30 to the side opposite to the valve seat 14. The spring 43 can bias the needle 30 and the movable core 40 toward the valve seat 14.

The fuel injection device 1 configured as described above is an example of a fuel injection device to which the present disclosure is applied.

In the first embodiment, the fuel injection device 1 is center-mounted in the engine 80. Since atomization of the injected fuel spray is promoted by the fuel injection device 1 having the above configuration, it is possible to suppress adhesion of the fuel spray to the wall surfaces of the cylinder block 81, the cylinder head 90, and the piston 82, which form the combustion chamber 83 of the engine 80. It is therefore possible to suppress wetting of such wall surfaces with the fuel.

Second Embodiment

Figure 7A:
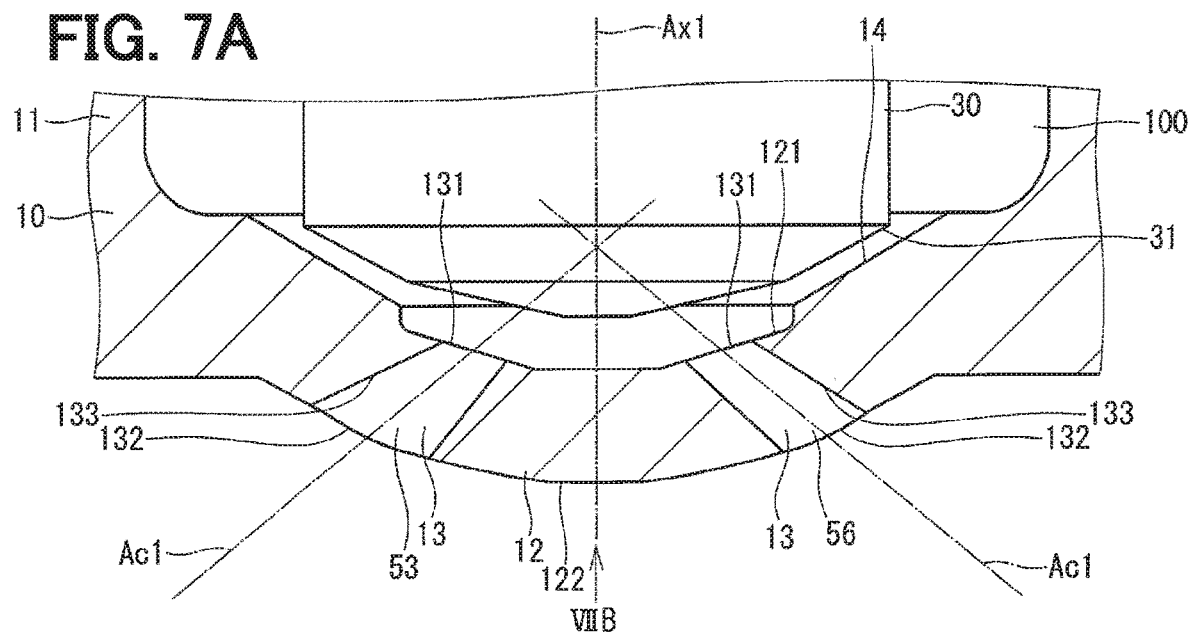
FIG. 7A is a sectional view illustrating an injection hole of a fuel injection device of a second embodiment of the present disclosure and the vicinity of the injection hole.
Figure 7B:
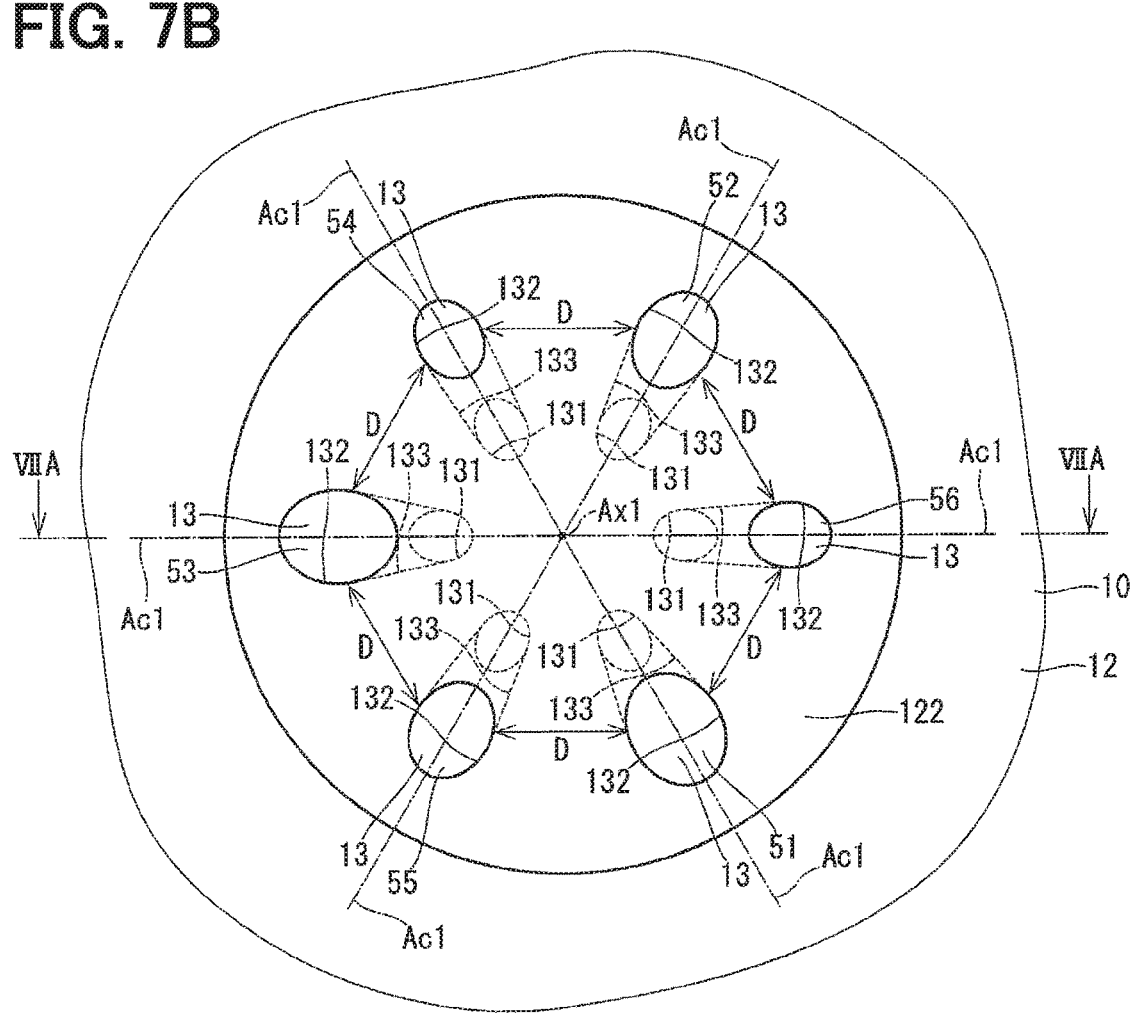
FIG. 7B is a view of FIG. 7A as seen from the direction of arrow VIIB.

FIGS. 7A and 7B illustrate a part of a fuel injection device of a second embodiment of the present disclosure. The second embodiment is different from the first embodiment in arrangement of the injection holes 51, 53, 54, and 56.

In the second embodiment, the injection holes 56, 52, 54, 53, 55, and 51 are formed so as to be arranged in this order in the circumferential direction of the nozzle bottom portion 12 (see FIG. 7B). In other words, the injection holes 56 and 53, 52 and 55, and 54 and 51 are each provided in the nozzle bottom portion 12 so as to be opposed to each other with respect to the axis Ax1 of the nozzle cylinder portion 11 (see FIGS. 7A and 7B).

When the arrangement of the injection holes 13 of the first embodiment is compared with the arrangement of the injection holes 13 of the second embodiment, positions of the injection holes 51 and 56 are exchanged from each other, and positions of the injection holes 53 and 54 are also exchanged from each other (see FIGS. 3B and 7B).

As shown in FIGS. 7A and 7B, in the second embodiment, among all combinations of two injection holes 13, in a combination (in the second embodiment, a combination of the injection holes 56 and 52, 52 and 54, 54 and 53, 53 and 55, or 55 and 51) in which when the injection holes are offset such that their central axes Ac1 are coincident with each other in the inlet openings 131, an inter-injection hole angle formed by the central axes Ac1 is minimized, the inter-injection hole angle between the two injection holes 13 is represented as γamin[deg], taper angles, which are formed by the respective contours of the injection hole inner walls 133 in the cross sections along the virtual planes including the central axes Ac1 of the two injection holes 13 (injection holes 56 and 52, 52 and 54, 54 and 53, 53 and 55, or 51 and 56) that allow the inter-injection hole angle to be minimized, are represented as θa1 and θa2[deg], and the injection holes 13 (injection holes 51 to 56) are formed so as to satisfy the following relationship.

$$\gamma a\min \geq \theta a1+\theta a2+0.5\times P^{0.6} \quad \text{(formula 1)}$$

As shown in FIG. 7, in the second embodiment, among all combinations of two injection holes 13, in a combination in which a distance D between the outlet openings 132 is minimized (in the second embodiment, a combination of the injection holes 53 and 55 or 55 and 51), when the injection holes 13 are offset such that their central axes Ac1 are coincident with each other in the inlet openings 131, an inter-injection hole angle formed by the central axes Ac1 is represented as γdmin[deg], and taper angles, which are formed by the respective contours of the injection hole inner walls 133 in the cross sections along the virtual planes including the central axes Ac1 of the two injection holes 13 (injection holes 53 and 55 or 55 and 51) that allow the distance D between the outlet openings 132 to be minimized, are represented as θd1 and θd2[deg], and the injection holes 13 (injection holes 51 to 56) are formed so as to satisfy the following relationship.

$$\gamma d\min \geq \theta d1+\theta d2+0.5\times P^{0.6} \quad \text{(formula 2)}$$

As described above, in the second embodiment, as in the first embodiment, the inter-injection hole angle between the two injection holes 13 in the combination in which the inter-injection hole angle is minimized, and the inter-injection hole angle between the two injection holes 13 in the combination, in which the distance D between the outlet openings 132 is minimized, are set based on the formulas 1 and 2 to values that are each less likely to be affected by the Coanda effect depending on the assumed pressure of the fuel in the fuel passage 100 during use of the fuel injection device. It is therefore possible to reduce unburned fuel and improve fuel economy as in the first embodiment.

Third Embodiment

Figure 8A:
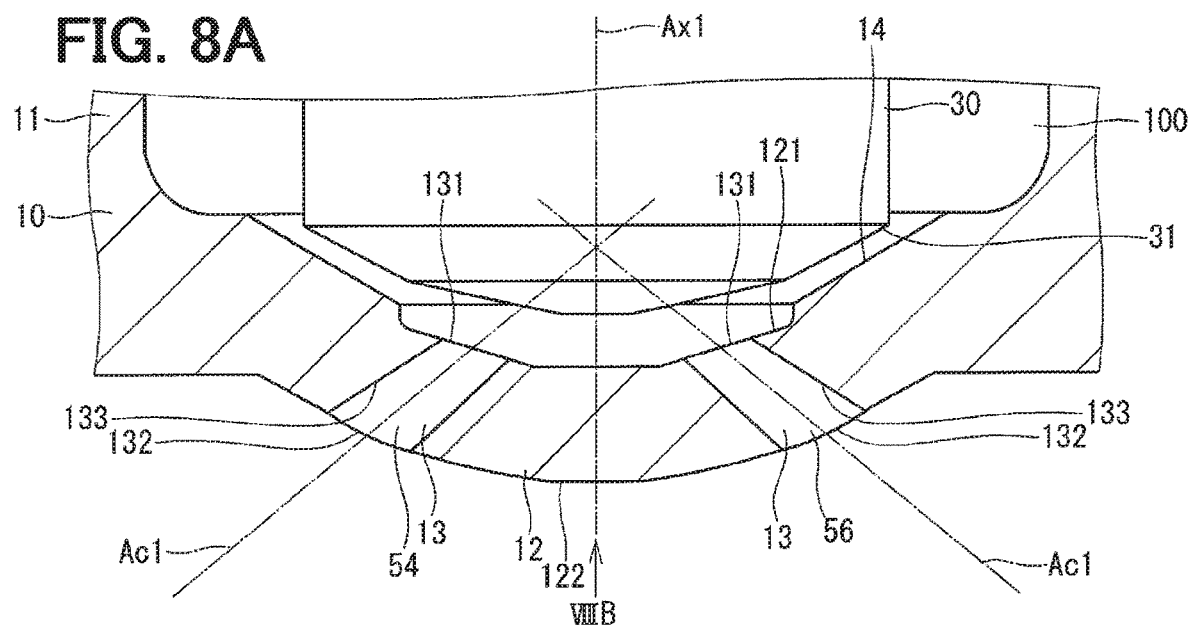
FIG. 8A is a sectional view illustrating an injection hole of a fuel injection device of a third embodiment of the present disclosure and the vicinity of the injection hole.
Figure 8B:
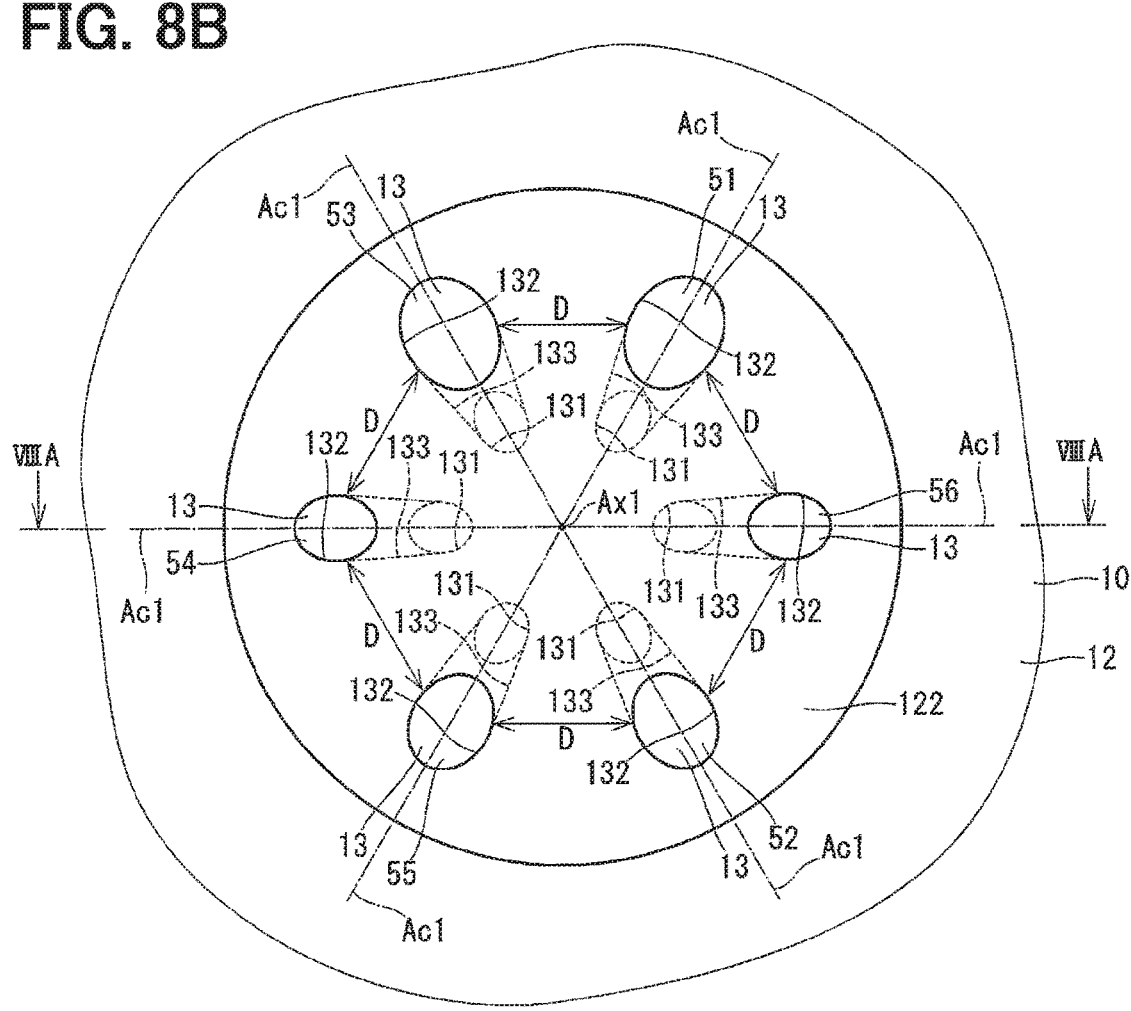
FIG. 8B is a view of FIG. 8A as seen from the direction of arrow VIIIB.

FIGS. 8A and 8B illustrate a part of a fuel injection device of a third embodiment of the present disclosure. The third embodiment is different from the first embodiment in arrangement of the injection holes 51, 52, and 56.

In the third embodiment, the injection holes 56, 51, 53, 54, 55, and 52 are formed so as to be arranged in this order in the circumferential direction of the nozzle bottom portion 12 (see FIG. 8B). In other words, the injection holes 56 and 54, 51 and 55, and 53 and 52 are each provided in the nozzle bottom portion 12 so as to be opposed to each other with respect to the axis Ax1 of the nozzle cylinder portion 11 (see FIGS. 8A and 8B).

When the arrangement of the injection holes 13 of the first embodiment is compared with the arrangement of the injection holes 13 of the second embodiment, positions of the injection holes 51, 52, and 56 are different, while positions of the injection holes 53, 54, and 55 are the same (see FIGS. 3B and 8B).

As shown in FIGS. 8A and 8B, in the third embodiment, among all combinations of two injection holes 13, in a combination (in the third embodiment, a combination of the injection holes 56 and 51, 51 and 53, 53 and 54, 54 and 55, 55 and 52, or 52 and 56) in which when the injection holes are offset such that their central axes Ac1 are coincident with each other in the inlet openings 131, an inter-injection hole angle formed by the central axes Ac1 is minimized, the inter-injection hole angle between the two injection holes 13 is represented as γamin[deg], taper angles, which are formed by the respective contours of the injection hole inner walls 133 in the cross sections along the virtual planes including the central axes Ac1 of the two injection holes 13 (injection holes 56 and 51, 51 and 53, 53 and 54, 54 and 55, 55 and 52, or 52 and 56) that allow the inter-injection hole angle to be minimized, are represented as θa1 and θa2[deg], and the injection holes 13 (injection holes 51 to 56) are formed so as to satisfy the following relationship.

$$\gamma amin \geq \theta a1 + \theta a2 + 0.5 \times P^{0.6} \quad \text{(formula 1)}$$

As shown in FIGS. 8A and 8B, in the third embodiment, among all combinations of two injection holes 13, in a combination in which a distance D between the outlet openings 132 is minimized (in the third embodiment, a combination of the injection holes 51 and 53), when the injection holes 13 are offset such that their central axes Ac1 are coincident with each other in the inlet openings 131, an inter-injection hole angle formed by the central axes Ac1 is represented as γdmin[deg], and taper angles, which are formed by the respective contours of the injection hole inner walls 133 in the cross sections along the virtual planes including the central axes Ac1 of the two injection holes 13 (injection holes 51 and 53) that allow the distance D between the outlet openings 132 to be minimized, are represented as θd1 and θd2[deg], and the injection holes 13 (injection holes 51 to 56) are formed so as to satisfy the following relationship.

$$\gamma d\ min \geq \theta d1 + \theta d2 + 0.5 \times p^{0.6} \quad \text{(formula 2)}$$

As described above, in the third embodiment, as in the first embodiment, the inter-injection hole angle between the two injection holes 13 in the combination in which the inter-injection hole angle is minimized, and the inter-injection hole angle between the two injection holes 13 in the combination, in which the distance D between the outlet openings 132 is minimized, are set based on the formulas 1 and 2 to values that are each less likely to be affected by the Coanda effect depending on the assumed pressure of the fuel in the fuel passage 100 during use of the fuel injection device. It is therefore possible to reduce unburned fuel and improve fuel economy as in the first embodiment.

Fourth Embodiment

Figure 9A:
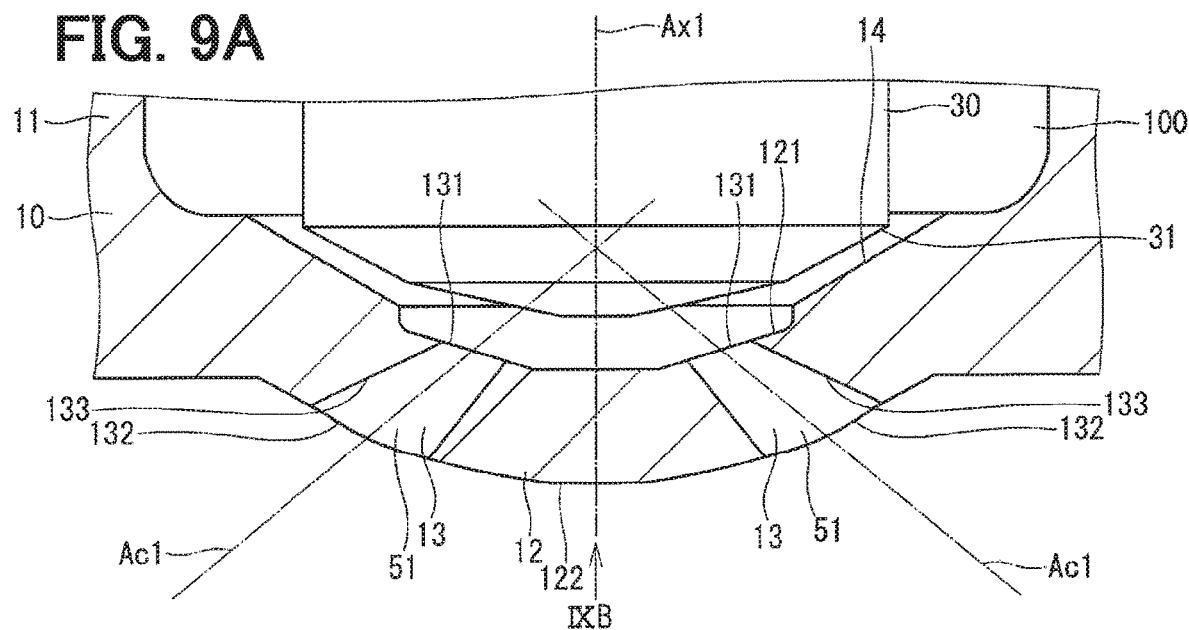
FIG. 9A is a sectional view illustrating an injection hole of a fuel injection device of a fourth embodiment of the present disclosure and the vicinity of the injection hole.
Figure 9B:
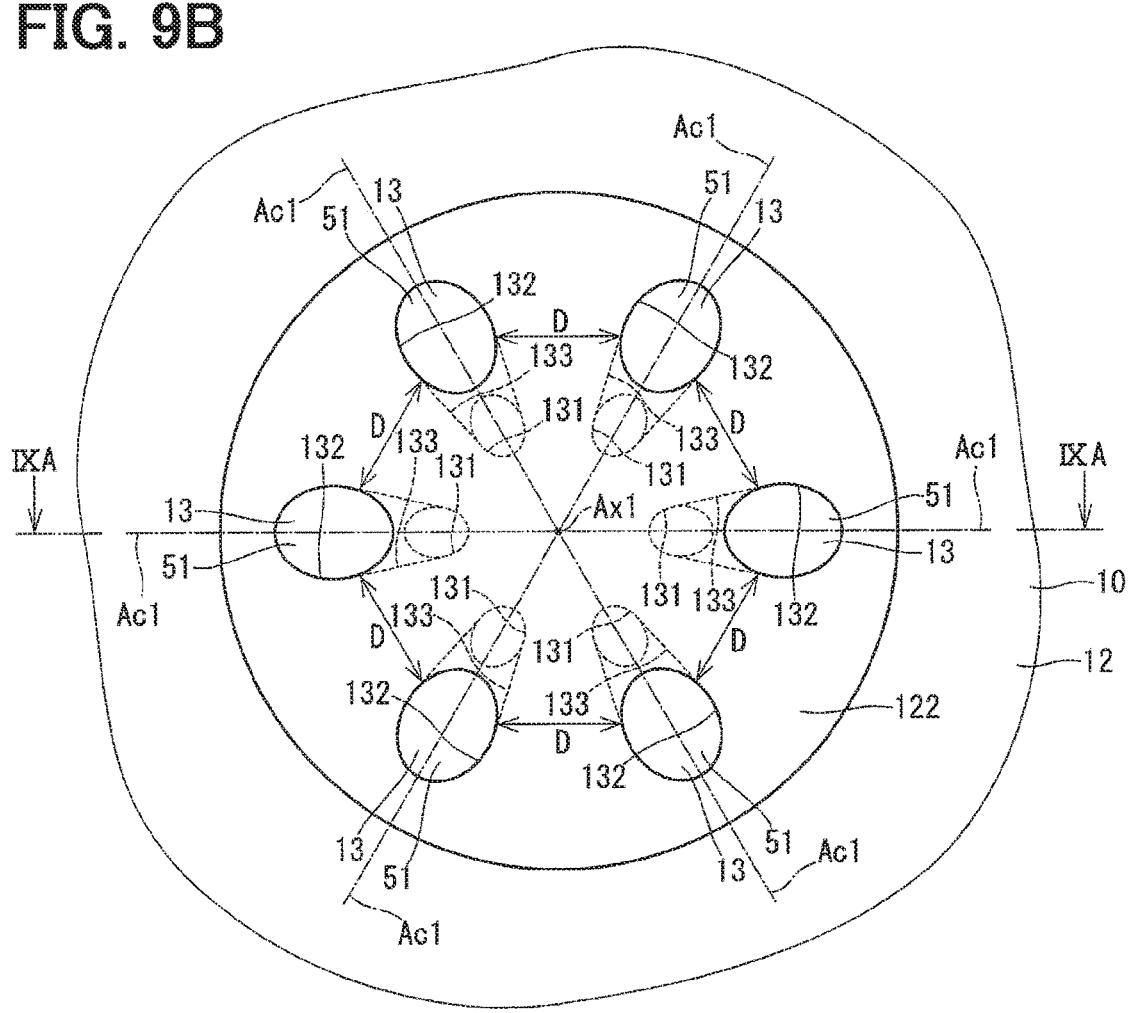
FIG. 9B is a view of FIG. 9A as seen from the direction of arrow IXB.

FIGS. 9A and 9B illustrate a part of a fuel injection device of a fourth embodiment of the present disclosure. The fourth embodiment is different from the first embodiment in shapes of the injection holes 13.

In the fourth embodiment, six injection holes 51 are formed so as to be arranged at equal intervals in the circumferential direction of the nozzle bottom portion 12 (see FIG. 9B). In other words, all the injection holes 13 have the same size in the fourth embodiment.

As shown in FIG. 9, in the fourth embodiment, among all combinations of two injection holes 13, in a combination (in the fourth embodiment, each of six combinations of the adjacent injection holes 51 and 51) in which when the injection holes are offset such that their central axes Ac1 are coincident with each other in the inlet openings 131, an inter-injection hole angle formed by the central axes Ac1 is minimized, the inter-injection hole angle between the two injection holes 13 is represented as γamin[deg], taper angles, which are formed by the respective contours of the injection hole inner walls 133 in the cross sections along the virtual planes including the central axes Ac1 of the two injection holes 13 (adjacent injection holes 51 and 51) that allow the inter-injection hole angle to be minimized, are represented as θa1 and θa2[deg], and the six injection holes 13 (injection holes 51) are formed so as to satisfy the following relationship.

$$\gamma amin \geq \theta a1 + \theta a2 + 0.5 \times P^{0.6} \quad \text{(formula 1)}$$

As shown in FIGS. 9A and 9B, in the fourth embodiment, among all combinations of two injection holes 13, in a combination in which a distance D between the outlet openings 132 is minimized in a combination (in the fourth embodiment, each of six combinations of the adjacent injection holes 51 and 51), when the injection holes 13 are offset such that their central axes Ac1 are coincident with each other in the inlet openings 131, an inter-injection hole angle formed by the central axes Ac1 is represented as γdmin[deg], and taper angles, which are formed by the respective contours of the injection hole inner walls 133 in the cross sections along the virtual planes including the central axes Ac1 of the two injection holes 13 (adjacent injection holes 51 and 51) that allow the distance D between the outlet openings 132 to be minimized, are represented as θd1 and θd2[deg], and the six injection holes 13 (injection holes 51) are formed so as to satisfy the following relationship.

$$\gamma d\ min \geq \theta d1 + \theta d2 + 0.5 \times p^{0.6} \quad \text{(formula 2)}$$

In the fourth embodiment, θa1=θa2 is given.

As described above, in the fourth embodiment, as in the first embodiment, the inter-injection hole angle between the two injection holes 13 in the combination in which the inter-injection hole angle is minimized, and the inter-injection hole angle between the two injection holes 13 in the combination, in which the distance D between the outlet openings 132 is minimized, are set based on the formulas 1 and 2 to values that are each less likely to be affected by the Coanda effect depending on the assumed pressure of the fuel in the fuel passage 100 during use of the fuel injection device. It is therefore possible to reduce unburned fuel and improve fuel economy as in the first embodiment.

Fifth Embodiment

Figure 10A:
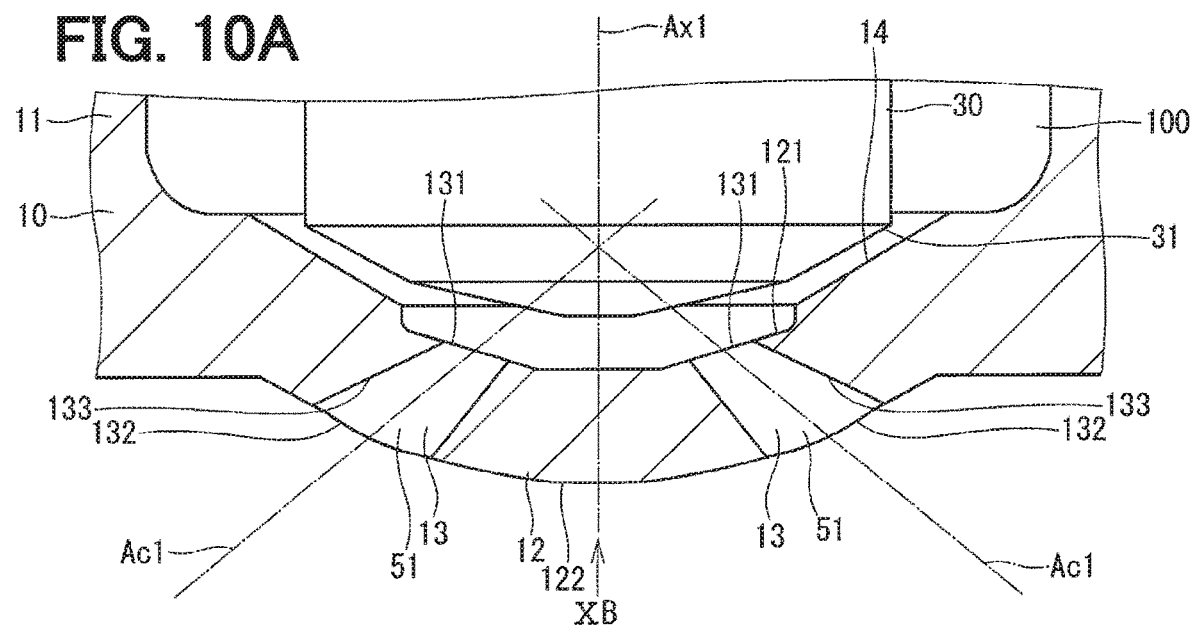
FIG. 10A is a sectional view illustrating an injection hole of a fuel injection device of a fifth embodiment of the present disclosure and the vicinity of the injection hole.
Figure 10B:
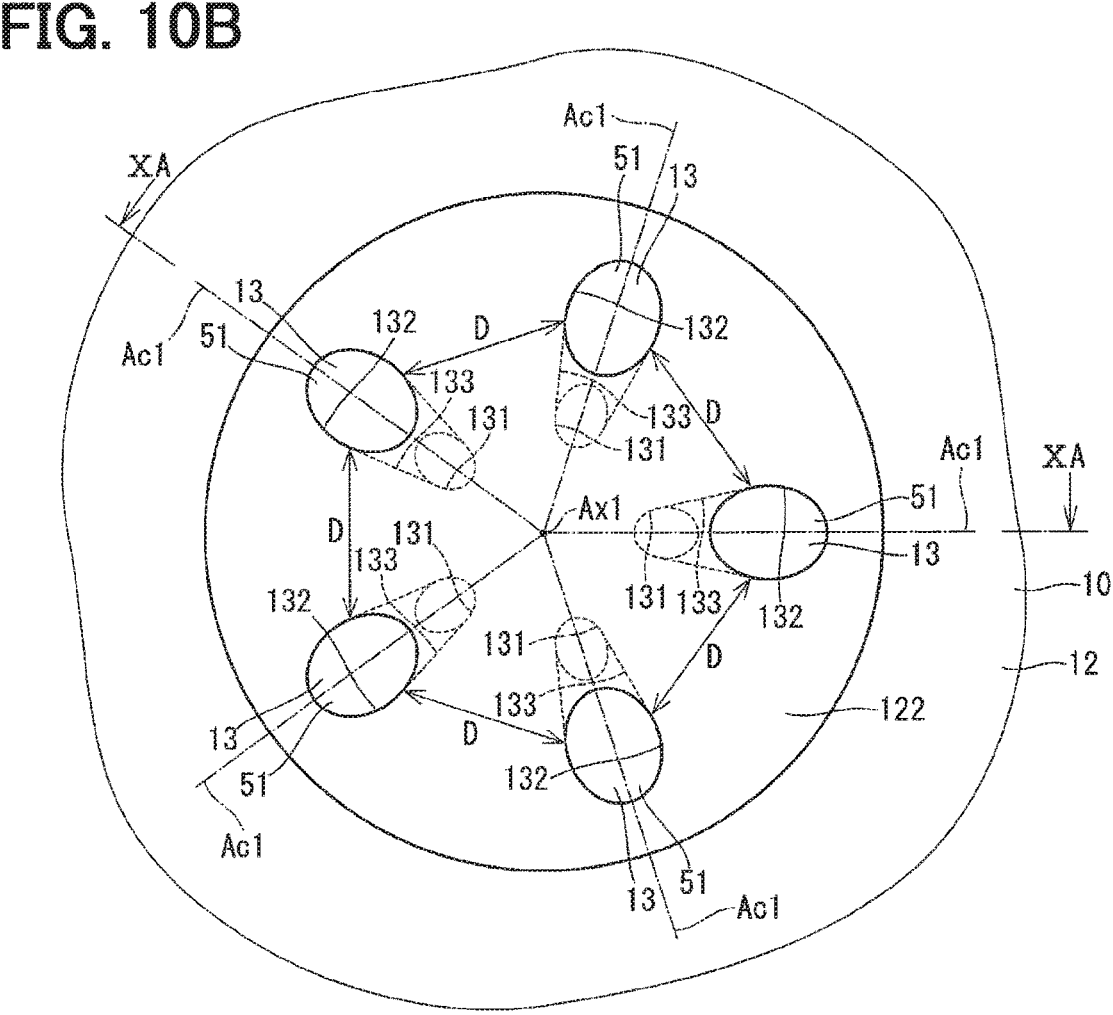
FIG. 10B is a view of FIG. 10A as seen from the direction of arrow XB.

FIGS. 10A and 10B illustrate a part of a fuel injection device of a fifth embodiment of the present disclosure. The fifth embodiment is different from the first embodiment in the number of the injection holes 13 and the like.

In the fifth embodiment, five injection holes 51 are formed so as to be arranged at equal intervals in the circumferential direction of the nozzle bottom portion 12 (see FIG. 10B). In other words, in the fifth embodiment, five injection holes 13 are formed at an interval of 72° in the circumferential direction of the nozzle bottom portion 12.

The fifth embodiment is the same as the fourth embodiment except for the above-described point.

In the fifth embodiment, it is also possible to reduce influence of the Coanda effect on the injected fuel spray and thus reduce unburned fuel and improve fuel economy as in the fourth embodiment.

Sixth Embodiment

Figure 11:
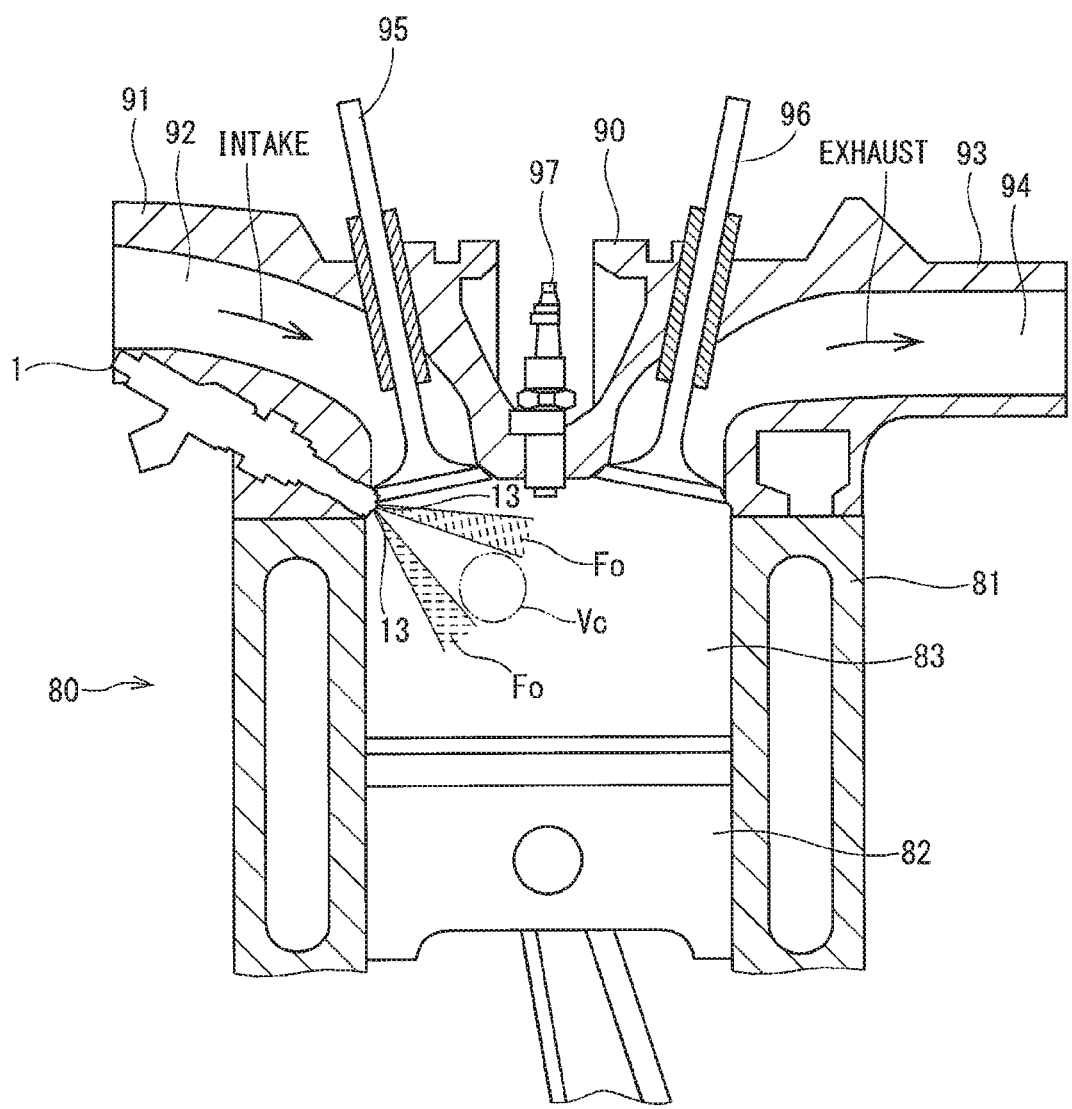
FIG. 11 is a view illustrating a state in which a fuel injection device of a sixth embodiment of the present disclosure is applied to an internal combustion engine.

FIG. 11 illustrates a fuel injection device of a sixth embodiment of the present disclosure. The sixth embodiment is different from the first embodiment in a mounting position of the fuel injection device 1 in the engine 80.

As shown in FIG. 11, in the sixth embodiment, the fuel injection device 1 is mounted in the intake manifold 91 on the side close to the cylinder block 81 with respect to the intake passage 92. The fuel injection device 1 is provided such that its axis is inclined with respect to the axis of the combustion chamber 83 or has a twisted relationship with the axis of the combustion chamber 83. In the fifth embodiment, the fuel injection device 1 is, as it is called, side-mounted in the engine 80.

An ignition plug 97 is provided between the intake valve 95 and the exhaust valve 96 of the cylinder head 90, i.e., provided at a position corresponding to the center of the combustion chamber 83. The ignition plug 97 is provided at a position at which combustible fuel-mixed air can be ignited while the fuel injected from the fuel injection device 1 does not directly adhere to the ignition plug.

The fuel injection device 1 is provided such that a plurality of injection holes 13 are exposed in a portion on a radially outer side of the combustion chamber 83. In the sixth embodiment, when a plurality of sprays Fo are injected from the injection holes 13, a negative pressure Vc is also generated between the sprays Fo. As a result, the sprays Fo are attracted to each other.

As described above, in the sixth embodiment, the fuel injection device 1 is side-mounted in the engine 80. Since atomization of the injected fuel spray is promoted by the fuel injection device 1 having the above configuration, it is possible to suppress wetting of the wall surfaces of the cylinder block 81, the cylinder head 90, and the piston 82, which form the combustion chamber 83 of the engine 80, with the fuel.

OTHER EMBODIMENTS

The above-described embodiments have been described with an example in which any of the injection holes 13 is formed such that the central axis Ac1 obliquely intersects the axis Ax1 of the nozzle cylinder portion 11. On the other hand, in another embodiment of the present disclosure, if the injection holes 13 are formed so as to satisfy the relationship of the formula 1 or 2, at least one of the injection holes 13 may be formed such that the central axis Ac1 has a twisted relationship with the axis Ax1 of the nozzle cylinder portion 11. In other words, an injection hole 13 may be formed such that its central axis Ac1 does not intersect the axis Ax1 of the nozzle cylinder portion 11.

The above-described embodiments have been described with an example in which when the fuel is injected from the injection hole 13, the average pressure P[Mpa] of the fuel in the fuel passage 100 is 20[Mpa]. On the other hand, in another embodiment of the present disclosure, if the injection holes 13 are formed so as to satisfy the relationship of the formula 1 or 2, P may be lower or higher than 20. In other words, the shape of the injection hole 13 can be appropriately set depending on the assumed pressure of the fuel in the fuel passage 100 during use of the fuel injection device.

The above-described embodiments have been described with an example in which the taper angle (θa1, θa2, θd1, θd2) of the injection hole 13 is set to about 14 to 18[deg]. On the other hand, in another embodiment of the present disclosure, if the injection holes 13 are formed so as to satisfy the relationship of the formula 1 or 2, the taper angle of the injection hole 13 may be smaller than 14[deg] or larger than 18[deg].

In another embodiment of the present disclosure, if the injection holes 13 are formed so as to satisfy the relationship of the formula 1 or 2, seven or more injection holes 13 may be formed in the nozzle bottom portion 12.

The above-described embodiments have been described with an example in which the fuel injection device is applied to a direct-injection gasoline engine. On the other hand, in another embodiment of the present disclosure, the fuel injection device may be applied to a diesel engine or a port-injection gasoline engine, for example. In such a case, adhesion of the fuel spray to the wall surfaces of the components forming an internal combustion engine, such as a cylinder block and a piston, can also be suppressed by the fuel injection device of the present disclosure. It is therefore possible to suppress wetting of such wall surfaces with the fuel.

As described above, the present disclosure should not be limited to the above-described embodiments, and can be carried out in various modes within the scope without departing from the gist of the present disclosure.

What is claimed is:

1. A fuel injection device, comprising
a nozzle part including a nozzle cylinder portion internally forming a fuel passage, a nozzle bottom portion closing one end of the nozzle cylinder portion, and a plurality of injection holes that connect between a surface of the nozzle bottom portion on a side close to the nozzle cylinder portion and a surface of the nozzle bottom portion on a side opposite to the nozzle cylinder portion, and inject fuel in the fuel passage, wherein
each of the injection holes includes an inlet opening formed in the surface of the nozzle bottom portion on the side close to the nozzle cylinder portion, an outlet opening formed in the nozzle bottom portion on the side opposite to the nozzle cylinder portion, and an injection hole inner wall that is connected to the inlet opening and the outlet opening and has a tapered shape so as to be gradually away from a central axis as going from the inlet opening toward the outlet opening, and
among all combinations of two of the injection holes, in a combination in which when the injection holes are offset such that central axes of the injection holes are coincident with each other in the inlet openings, an inter-injection hole angle formed by the central axes is minimized, the inter-injection hole angle between the two injection holes is represented as γamin[deg], taper angles, which are formed by respective contours of the injection hole inner walls in cross sections along virtual planes including the central axes of the two injection holes that allow the inter-injection hole angle to be minimized, are represented as θa1 and θa2[deg], and when fuel is injected from the injection holes, average pressure of the fuel in the fuel passage is represented as P [Mpa], and the injection holes are formed so as to satisfy the following relationship:

$\gamma a min \geq \theta a1 + \theta a2 + 0.5 \times P^{0.6}$, wherein the inlet opening is located on a concentric circle, and the fuel is gasoline.

2. A fuel injection device, comprising:
a nozzle part including a nozzle cylinder portion internally forming a fuel passage, a nozzle bottom portion closing one end of the nozzle cylinder portion, and a plurality of injection holes that connect between a surface of the nozzle bottom portion on a side close to the nozzle cylinder portion and a surface of the nozzle bottom portion on a side opposite to the nozzle cylinder portion, and inject fuel in the fuel passage, wherein
each of the injection holes includes an inlet opening formed in the surface of the nozzle bottom portion on the side close to the nozzle cylinder portion, an outlet opening formed in the nozzle bottom portion on the side opposite to the nozzle cylinder portion, and an injection hole inner wall that is connected to the inlet opening and the outlet opening and has a tapered shape so as to be gradually away from a central axis as going from the inlet opening toward the outlet opening, and
among all combinations of two of the injection holes, in a combination in which a distance between the outlet openings is minimized, when the injection holes are offset such that central axes of the injection holes are coincident with each other in the inlet openings, an inter-injection hole angle formed by the central axes is represented as γdmin[deg], taper angles, which are formed by respective contours of the injection hole inner walls in cross sections along virtual planes including the central axes of the two injection holes that allow the distance between the outlet openings to be minimized, are represented as θd1 and θd2[deg], and when fuel is injected from the injection holes, the average pressure of the fuel in the fuel passage is represented as P[Mpa], and the injection holes are formed so as to satisfy the following relationship:

$\gamma d\ min \geq \theta d1 + \theta d2 + 0.5 \times p^{0.6}$, wherein the inlet opening is located on a concentric circle, and the fuel is gasoline.

3. The fuel injection device according to claim 1, wherein
the fuel injection device is of a direct injection type to inject fuel directly into a combustion chamber of an internal combustion engine, and
the fuel injection device is of a side-mounted type to be mounted on a radially outer side of the combustion chamber.

4. The fuel injection device according to claim 2, wherein
the fuel injection device is of a direct injection type to inject fuel directly into a combustion chamber of an internal combustion engine, and
the fuel injection device is of a side-mounted type to be mounted on a radially outer side of the combustion chamber.

5. The fuel injection device according to claim 1, wherein
the nozzle part has the injection holes being five or more injection holes.

6. The fuel injection device according to claim 2, wherein
the nozzle part has the injection holes being five or more injection holes.

7. The fuel injection device according to claim 1, wherein
the nozzle part has a valve seat annularly formed around the inlet openings on the nozzle bottom portion,
the fuel injection device further comprising:
a cylindrical housing connected to the nozzle cylinder portion on a side opposite to the nozzle bottom portion;
a needle that is provided within the housing so as to have one end contactable with the valve seat and to be able to reciprocate in the axial direction, and opens or closes the injection holes when the one end separates from or comes into contact with the valve seat;
a movable core provided so as to be able to reciprocate together with the needle within the housing;
a stationary core provided within the housing on an opposite side of the movable core from the valve seat;
a coil capable of attracting the movable core toward the stationary core to move the needle to a side opposite to the valve seat when the coil is energized; and
a valve seat side biasing component capable of biasing the needle and the movable core toward the valve seat.

8. The fuel injection device according to claim 2, wherein
the nozzle part has a valve seat annularly formed around the inlet openings on the nozzle bottom portion,
the fuel injection device further comprising:
a cylindrical housing connected to the nozzle cylinder portion on a side opposite to the nozzle bottom portion;
a needle that is provided within the housing so as to have one end contactable with the valve seat and to be able to reciprocate in the axial direction, and opens or closes the injection holes when the one end separates from or comes into contact with the valve seat;
a movable core provided so as to be able to reciprocate together with the needle within the housing;
a stationary core provided within the housing on an opposite side of the movable core from the valve seat;
a coil capable of attracting the movable core toward the stationary core to move the needle to a side opposite to the valve seat when the coil is energized; and
a valve seat side biasing component capable of biasing the needle and the movable core toward the valve seat.

9. The fuel injection device according to claim 1, wherein
the inlet opening is on the concentric circle concentric to a central axis of the inlet opening.

10. The fuel injection device according to claim 2, wherein
the inlet opening is on the concentric circle concentric to a central axis of the inlet opening.

* * * * *